United States Patent
Watanabe

(10) Patent No.: US 7,593,133 B2
(45) Date of Patent: Sep. 22, 2009

(54) INKJET PRINTING DEVICE

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 943 days.

(21) Appl. No.: 11/057,145

(22) Filed: Feb. 15, 2005

(65) Prior Publication Data

US 2005/0179952 A1  Aug. 18, 2005

(30) Foreign Application Priority Data

Feb. 16, 2004  (JP) .............................. 2004-038800
Feb. 23, 2004  (JP) .............................. 2004-046766

(51) Int. Cl.
*H04N 1/54* (2006.01)
*H04N 1/60* (2006.01)
*H04N 1/40* (2006.01)
*G06K 9/00* (2006.01)

(52) U.S. Cl. ........................ 358/1.9; 358/3.24; 358/523; 358/518; 358/3.23; 358/2.1; 358/3.26; 358/3.31; 382/111

(58) Field of Classification Search ................ 358/3.23, 358/2.1, 3.26, 3.31, 1.9, 3.24, 523, 518; 382/111; 347/102, 43, 21, 100
See application file for complete search history.

(56) References Cited

U.S. PATENT DOCUMENTS 5,988,791 A * 11/1999 Miyashita et al. ............. 347/43

6,398,358 B1 * 6/2002 Miyake et al. .............. 347/102
6,859,291 B1 * 2/2005 Katoh ......................... 358/1.9
2002/0196457 A1 12/2002 Nunokawa

FOREIGN PATENT DOCUMENTS

| JP | A 6-98161 | 4/1994 |
|---|---|---|
| JP | A-06-320743 | 11/1994 |
| JP | A-10-510930 | 10/1998 |
| JP | A 2001-341394 | 12/2001 |
| JP | A 2003-1876 | 1/2003 |
| WO | WO 96/17264 A1 | 6/1996 |
| WO | WO 02/28660 A2 | 4/2002 |

* cited by examiner

*Primary Examiner*—Edward L Coles
*Assistant Examiner*—Charlotte M Baker
(74) *Attorney, Agent, or Firm*—Oliff & Berridge, PLC

(57) ABSTRACT

A print data creating device that creates print data for an inkjet printer. The inkjet printer is configured to print an image on a fabric in accordance with the print data. The print data creating device is provided with a color conversion table storage that stores color conversion tables corresponding to washing conditions representing conversions to be made when the fabric will be washed after the image is printed thereon, a washing condition designating system which is operated by a user to input a washing condition, a table selecting system that selects one of the color conversion tables stored in the color conversion table storage in accordance with the washing condition input through the washing condition designating system, and a print data creating system that creates the print data using the color conversion table selected by the table selecting system.

14 Claims, 29 Drawing Sheets

421

| \multicolumn{7}{|c|}{FIRST OUTPUT SIDE COLOR CONVERSION TABLE} |
|---|---|---|---|---|---|---|
| L* VALUE | a* VALUE | b* VALUE | C VALUE | M VALUE | Y VALUE | K VALUE |
| ⋮ | ⋮ | ⋮ | ⋮ | ⋮ | ⋮ | ⋮ |
| 50 | 0 | 0 | 138 | 117 | 117 | 28 |
| 50 | 0 | 10 | 128 | 112 | 148 | 36 |
| 50 | 0 | 20 | 120 | 110 | 179 | 43 |
| 50 | 0 | 30 | 115 | 110 | 212 | 46 |
| 50 | 0 | 40 | 112 | 110 | 252 | 46 |
| ⋮ | ⋮ | ⋮ | ⋮ | ⋮ | ⋮ | ⋮ |

422

| \multicolumn{7}{|c|}{SECOND OUTPUT SIDE COLOR CONVERSION TABLE} |
|---|---|---|---|---|---|---|
| L* VALUE | a* VALUE | b* VALUE | C VALUE | M VALUE | Y VALUE | K VALUE |
| ⋮ | ⋮ | ⋮ | ⋮ | ⋮ | ⋮ | ⋮ |
| 50 | 0 | 0 | 132 | 111 | 110 | 19 |
| 50 | 0 | 10 | 127 | 105 | 144 | 30 |
| 50 | 0 | 20 | 118 | 106 | 178 | 41 |
| 50 | 0 | 30 | 106 | 102 | 205 | 44 |
| 50 | 0 | 40 | 110 | 105 | 246 | 40 |
| ⋮ | ⋮ | ⋮ | ⋮ | ⋮ | ⋮ | ⋮ |

THIRD OUTPUT SIDE COLOR CONVERSION TABLE

| L* VALUE | a* VALUE | b* VALUE | C VALUE | M VALUE | Y VALUE | K VALUE |
|---|---|---|---|---|---|---|
| ⋮ | ⋮ | ⋮ | ⋮ | ⋮ | ⋮ | ⋮ |
| 50 | 0 | 0 | 58 | 60 | 44 | 14 |
| 50 | 0 | 10 | 68 | 101 | 134 | 16 |
| 50 | 0 | 20 | 68 | 97 | 132 | 22 |
| 50 | 0 | 30 | 47 | 45 | 109 | 19 |
| 50 | 0 | 40 | 74 | 45 | 120 | 29 |
| ⋮ | ⋮ | ⋮ | ⋮ | ⋮ | ⋮ | ⋮ |

FOURTH OUTPUT SIDE COLOR CONVERSION TABLE

| L* VALUE | a* VALUE | b* VALUE | C VALUE | M VALUE | Y VALUE | K VALUE |
|---|---|---|---|---|---|---|
| ⋮ | ⋮ | ⋮ | ⋮ | ⋮ | ⋮ | ⋮ |
| 50 | 0 | 0 | 51 | 50 | 36 | 13 |
| 50 | 0 | 10 | 65 | 97 | 130 | 9 |
| 50 | 0 | 20 | 67 | 88 | 128 | 13 |
| 50 | 0 | 30 | 47 | 35 | 107 | 19 |
| 50 | 0 | 40 | 67 | 43 | 115 | 27 |
| ⋮ | ⋮ | ⋮ | ⋮ | ⋮ | ⋮ | ⋮ |

| INPUT SIDE COLOR CONVERSION TABLE | | | | | |
|---|---|---|---|---|---|
| R VALUE | G VALUE | B VALUE | L* VALUE | a* VALUE | b* VALUE |
| ⋮ | ⋮ | ⋮ | ⋮ | ⋮ | ⋮ |
| 119 | 119 | 119 | 50 | 0 | 0 |
| 125 | 119 | 102 | 50 | 0 | 10 |
| 129 | 119 | 85 | 50 | 0 | 20 |
| 132 | 118 | 67 | 50 | 0 | 30 |
| 135 | 118 | 48 | 50 | 0 | 40 |
| ⋮ | ⋮ | ⋮ | ⋮ | ⋮ | ⋮ |

| INPUT RGB DATA | | | |
|---|---|---|---|
| PIXEL # | R VALUE | G VALUE | B VALUE |
| 1 | 129 | 119 | 85 |
| 2 | 128 | 0 | 0 |
| 3 | 0 | 128 | 0 |
| 4 | 0 | 0 | 128 |
| 5 | 0 | 150 | 150 |
| 6 | 200 | 200 | 0 |
| 7 | 70 | 70 | 70 |
| ⋮ | ⋮ | ⋮ | ⋮ |

CONVERTED L*a*b VALUE DATA

| PIXEL # | L* VALUE | a* VALUE | b* VALUE |
|---|---|---|---|
| 1 | 50 | 0 | 20 |
| 2 | 26 | 48 | 39 |
| 3 | 48 | −48 | 49 |
| 4 | 11 | 41 | −67 |
| 5 | 56 | −34 | −10 |
| 6 | 79 | −13 | 78 |
| 7 | 30 | 0 | 0 |
| ⋮ | ⋮ | ⋮ | ⋮ |

CONVERTED CMYK DATA

| PIXEL # | C VALUE | M VALUE | Y VALUE | K VALUE |
|---|---|---|---|---|
| 1 | 120 | 110 | 179 | 43 |
| 2 | 76 | 255 | 255 | 107 |
| 3 | 242 | 33 | 255 | 28 |
| 4 | 255 | 249 | 61 | 66 |
| 5 | 226 | 68 | 132 | 20 |
| 6 | 86 | 43 | 255 | 5 |
| 7 | 130 | 160 | 153 | 114 |
| ⋮ | ⋮ | ⋮ | ⋮ | ⋮ |

332

| CONVERTED CMYK DATA | | | | |
|---|---|---|---|---|
| PIXEL # | C VALUE | M VALUE | Y VALUE | K VALUE |
| 1 | 118 | 106 | 178 | 41 |
| 2 | 73 | 255 | 249 | 102 |
| 3 | 219 | 25 | 255 | 17 |
| 4 | 255 | 242 | 51 | 53 |
| 5 | 219 | 61 | 127 | 12 |
| 6 | 76 | 38 | 255 | 0 |
| 7 | 127 | 153 | 147 | 107 |
| ⋮ | ⋮ | ⋮ | ⋮ | ⋮ |

333

| CONVERTED CMYK DATA | | | | |
|---|---|---|---|---|
| PIXEL # | C VALUE | M VALUE | Y VALUE | K VALUE |
| 1 | 68 | 97 | 132 | 22 |
| 2 | 27 | 93 | 70 | 44 |
| 3 | 61 | 13 | 105 | 11 |
| 4 | 75 | 84 | 23 | 21 |
| 5 | 104 | 22 | 39 | 6 |
| 6 | 22 | 14 | 78 | 1 |
| 7 | 52 | 40 | 43 | 31 |
| ⋮ | ⋮ | ⋮ | ⋮ | ⋮ |

| CONVERTED CMYK DATA | | | | |
|---|---|---|---|---|
| PIXEL # | C VALUE | M VALUE | Y VALUE | K VALUE |
| 1 | 67 | 88 | 128 | 13 |
| 2 | 26 | 88 | 66 | 39 |
| 3 | 57 | 10 | 104 | 6 |
| 4 | 72 | 83 | 20 | 17 |
| 5 | 103 | 20 | 37 | 1 |
| 6 | 19 | 9 | 76 | 0 |
| 7 | 50 | 36 | 42 | 29 |
| ⋮ | ⋮ | ⋮ | ⋮ | ⋮ |

PRINT

PRINT IS STARTED. OK?
SELECT WASHING CONDITION

■ WASHING CONDITION

FABRIC  ◉ COTTON   ○ RAYON
WASHING METHOD  ◉ WATER   ○ DRY CLEANING

OK    CANCEL

| PRINT ENVIRONMENT | OUTPUT SIDE COLOR CONVERSION TABLE |
|---|---|
| TEMPERATURE:0 °C /HUMIDITY 20%/ PRINT RESOLUTION:300 dpi | COLOR CONVERSION TABLE #1 |
| TEMPERATURE:10 °C /HUMIDITY 20%/ PRINT RESOLUTION:300 dpi | COLOR CONVERSION TABLE #2 |
| ⋮ | ⋮ |
| TEMPERATURE:50 °C /HUMIDITY 100%/ PRINT RESOLUTION:600 dpi | COLOR CONVERSION TABLE #89 |
| TEMPERATURE:50 °C /HUMIDITY 100%/ PRINT RESOLUTION:1200 dpi | COLOR CONVERSION TABLE #90 |

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

| 1 | 1 | 1 | 1 | 1 |
|---|---|---|---|---|
| 1 | 1 | 0 | 1 | 1 |
| 0 | 1 | 1 | 0 | 1 |
| 1 | 0 | 1 | 1 | 1 |
| 1 | 0 | 1 | 0 | 1 |

| 1 | 0 | 1 | 0 | 1 |
|---|---|---|---|---|
| 0 | 1 | 0 | 1 | 1 |
| 0 | 0 | 1 | 0 | 1 |
| 1 | 0 | 1 | 1 | 1 |
| 1 | 0 | 1 | 0 | 0 |

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

| 0 | 1 | 0 | 1 | 0 |
|---|---|---|---|---|
| 1 | 0 | 0 | 1 | 0 |
| 0 | 0 | 1 | 0 | 1 |
| 1 | 0 | 0 | 1 | 0 |
| 1 | 0 | 1 | 0 | 1 |

| 0 | 0 | 1 | 0 | 1 |
|---|---|---|---|---|
| 0 | 1 | 0 | 0 | 0 |
| 0 | 0 | 0 | 0 | 1 |
| 1 | 0 | 1 | 0 | 0 |
| 0 | 0 | 0 | 1 | 0 |

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

INKJET PRINTING DEVICE

INCORPORATION BY REFERENCE

This application claims priority from Japanese Patent Applications No. 2004-38800, filed on Feb. 16, 2004, and No 2004-46766, filed on Feb. 23, 2004, the entire subject matters of the applications are incorporated herein by reference thereto.

BACKGROUND OF THE INVENTION

The present invention relates to an inkjet printing device, printing system and a method of executing a printing operation on a fabric.

Conventionally, image data is created on a personal computer (hereinafter, occasionally referred to as a PC) with displaying an image represented by the image data being displayed on a monitor device. Such image data is converted into print data for use in a printer, and then the printer print outs the image in accordance with the print data which corresponds to the image data.

When an image is displayed on the monitor device of the PC, the image consists of a plurality of pixels. Each of the pixels has gradation data representing brightness of three primary colors (i.e., R: red; G: green; and B: blue). However, there are various kinds of monitor devices having different characteristics. Therefore, the same RGB data may be displayed differently depending on the monitor devices.

In order to have the image displayed to have the same color in any monitor device, L*a*b* data has recently been employed. The L*a*b* format data includes gradation data of L* value (brightness value), a* value (degree of a change of colors from red to green) and b* value (degree of a change of colors from blue to yellow) for each pixel. For each monitor device, a conversion table from the RGB values to the L*a*b* values (which is referred to as a color profile), and a color of a pixel defined by L*a*b* data appears to have the same color regardless of the monitor devices.

In an output device of the image data (e.g., a printer), conventionally, colors have been expressed using CMY format data or CMYK format data. In the CMY format, a color of a pixel is divided in to three primary colors (C: cyan; M: magenta; and Y: yellow), and is represented by gradation data of each color component. In the CMYK format, in addition to the three primary colors, a component of K (black) is introduced (i.e., a color is represented by gradation data of four color components).

When image data is output (i.e., printed out) using an output device (e.g., a printer), it is necessary to adjust the colors displayed on the monitor device and printed by the output device. For this purpose, conventionally, a conversion table (a color profile) has been employed. For example, a method of converting RGB format data to the CMY format is disclosed in Japanese Patent Provisional Publication No. SHO59-41227, or a method disclosed in Japanese Patent Provisional Publication No. HEI 06-98161.

When an image is printed on an object such as a fabric (e.g., a T-shirt), it will be washed after the image has been printed. In such a case, color-dulling may occur. Additionally, depending on a type of the fabric, a condition of a surface changes (e.g., shagging occurs/suppressed), which results in the appearance of the fabric in terms of the color of the printed image. Thus, the resultant image becomes different from a result expected before in terms of its color.

Another problem is that, when a printing operation is repeated to print the same image, there occurs variations in the printed images. Further, in some cases, an expected print result cannot be achieved. It is because, when the printing operation is performed, there are factors which affect on the print result by varying a printing environment. For example, the factors that affect the print result may include a temperature, humidity, a type (kind) of the object and a printing resolution. Depending on the settings of such factors, the printing environment differs (e.g., penetrating and/or drying characteristics are changed), which may results in the print results.

Conventionally, a method has been suggested to deal with the change of the printing environment by compensating for the print data. For example, when the print data is created based on image data, a compensation is incorporated taking the environment when the printing is executed, thereby appropriate print data corresponding to the environment being created. Using the print data thus create, a desired printing result can be obtained.

Further, according to a conventional technique, the temperature and humidity inside the printer are measured, and if the measured values have been varied, density compensation data corresponding to the changed environment condition is selected. Then, referring to a thickness density compensation table, which has been prepared by measuring a plurality of levels of thickness density values and created based thereon, the thickness density when printing is compensated, the change of the environment condition is dealt with. An example of such a compensation method is disclosed in Japanese Patent Provisional Publication P2001-341394A.

According to Japanese Patent Provisional Publication P2003-1876A, the temperature and humidity inside the printer are measured, and print control information such as ink duty, color conversion table, path rest duration is selected, with which the printing operation is controlled. Then, variation of image quality due to the variation of the temperature and/humidity inside the printer and type of a recording sheet can be compensated.

The above examples in which the print data is preliminary compensated are effective if a time period from an instruction to print at the PC to the start of the printing at the printer is relatively short. However, if the time period is relatively long, the environment may change after the compensated print data is created and before the printing operation is executed.

In particular, the above problem is significant when the compensated data is used in business inkjet printers for fabrics. Such printers are typically configured such that the print data created by a PC is stored in the inkjet printer, and the printing operations are executed by a plurality of times but intermittently in accordance with the same print data as stored. Since the print data is created independent of the printing environment, and the printing operations are executed intermittently, the environment when each printing operation is executed may be different from the environment the print data corresponds to. Therefore, in this case, the print data may not be effected even if the data is compensated for.

Further, publications P2001-341394A and P2003-1876A are intended such that print data is compensated for immediately before the printing operation is executed. Therefore, a processing time period prior to the printing operation is elongated in comparison with a case where such compensation is not executed. For a use, it means that a time period necessary for a data processing prior to the printing is elongated, which requires the user to wait for a longer period after the user has instructed to start the printing operation. Additionally, during such a waiting time, the printing environment may further change and the effectiveness of the compensation may decrease.

If the above compensation method is applied to the business inkjet printer for fabrics as described above, the compensation process is executed at every execution of the printing operation. Therefore, not only at each printing operation but the entire processing time period is elongated.

SUMMARY OF THE INVENTION

The present invention is advantageous in that a printing system suitable to print an image on an object which is to be washed after the image is printed thereon.

The present invention is also advantageous in that a printing system capable of printing images in accordance with environmental condition, printing condition or the like so that a quality of the printed image is maintained regardless of the change of the conditions.

According to an aspect of the invention, there is provided a print data creating device that creates print data for an inkjet printer, the inkjet printer printing an image on a fabric in accordance with the print data. The print data creating device is provided with a color conversion table storage that stores color conversion tables corresponding to washing conditions representing conversions to be made when the fabric will be washed after the image is printed thereon, a washing condition designating system which is operated by a user to input a washing condition, a table selecting system that selects one of the color conversion tables stored in the color conversion table storage in accordance with the washing condition input through the washing condition designating system, and a print data creating system that creates the print data using the color conversion table selected by the table selecting system.

Optionally, the washing condition designating system may include a fabric type input system with which the user can input a type of the fabric, and a washing method determining system that determined a washing method based on the fabric type input through the fabric type input system, the washing method being included in the washing condition.

Further, the washing condition designating system may include a washing method input system through which the user inputs a washing method with which the fabric will be washed after the image is printed thereon. In this case, the washing condition designating system may be used to designated at least one of a kind of washing and the number of times of washings.

Still optionally, the washing condition designating system may include a fabric type input system with which the user can input a type of the fabric, and a washing method input system with which the user input a washing method to be used when the fabric is washed after the image is printed thereon. In this case, the washing condition designating system may be used to designated at least one of a kind of washing and the number of times of washings.

According to another aspect of the invention, there is provided a method of creating print data for an inkjet printer, the inkjet printer printing an image on a fabric in accordance with the print data. The method includes the steps of (a) designating a washing condition to be applied to the fabric on which the image is formed, (b) selecting a color conversion tables from among a plurality of preliminarily stored color conversion tables in accordance with the washing condition input in the designating step, and (c) creating the print data using the color conversion table selected in the designating step.

In a particular case, the designating step may include the steps of inputting a fabric type input, and determining a washing method based on the fabric type input in the inputting step.

Optionally, the designating step may include a step of inputting a washing method with which the fabric will be washed after the image is printed thereon. In this case, the step of designating may designate at least one of a kind of washing and the number of times of washings.

Still optionally, the step of designating may include the steps of inputting a type of the fabric, and inputting a washing method to be used when the fabric is washed after the image is printed thereon. In this case, the step of designating may designate at least one of a kind of washing and the number of times of washings.

Further optionally, the method above may further include the steps of creating a color conversion table by measuring a test patch that has been formed on the fabric, the fabric having been washed after the test patch was printed thereon, and storing the color conversion table created in the step of creating.

According to a further aspect of the invention, there is provided a computer program product having computer readable instructions that cause a computer to execute a procedures of creating print data for an inkjet printer, the inkjet printer printing an image on a fabric in accordance with the print data. The procedure includes the steps of (a) designating a washing condition to be applied to the fabric on which the image is formed, (b) selecting a color conversion tables from among a plurality of preliminarily stored color conversion tables in accordance with the washing condition input in the designating step, and (c) creating the print data using the color conversion table selected in the designating step.

According to another aspect of the invention, there is provided a printing device that executes a printing operation, in accordance with print data which is created from an image data, on an object. The printing device is provided with a print data storing system that stores a plurality of pieces of print data respectively corresponding to a plurality of print environment conditions, the plurality of print environment conditions being defined by at least one factor, which affects a print result, at different values, a print environment condition obtaining system that obtains the print environment condition at the printer, a print data selecting system that selects one of the plurality of pieces of print data corresponding to the print environment condition obtained by the print environment condition obtaining system from among the plurality of print data stored in the print data storing system, and a print executing system that executes a printing operation in accordance with the one of the plurality of pieces of the print data selected by the print data selecting system.

Optionally, the print environment condition may include an environment condition which includes a factor representing an environment of the printing device, and the print environment condition obtaining system may include an environment condition measuring system that measures the factor representing the environment of the printing device.

In this case, the factor representing the environment of the printing device may include at least one of temperature and humidity inside the printing device.

Further optionally, the print environment condition may include a print condition, which is setting information representing a condition in which the printing operation is executed, and the print environment condition obtaining system may include a print condition inputting system through which the print condition can be input.

Further, the print condition may include at least one of a type of the object, a print resolution at which the printing device print an image, and a print method.

Still optionally, the printing device may further include a print instructing system that instructs execution of the printing operation, and the print environment condition obtaining system may obtain the print environment condition when the execution of the printing operation is instructed through the print instructing system.

Optionally, the print data selecting system may select print data corresponding to the print environment condition that exactly or approximately coincides with the print environment condition obtained by the print environment condition obtaining system.

According to a further aspect of the invention, there is provided a printing system having a print data creating device and a printing device. The print data creating device is provided with a print data creating system that creates, from image data, a plurality of pieces of print data respectively corresponding to a plurality of print environment conditions, the plurality of print environment conditions being defined by at least one factor affecting a print result at different values, and a print data transmitting system that transmits the plurality of pieces of print data to the printing device. While, the printing device is provided with print data storing system that stores the plurality of pieces of print data transmitted from the print data transmitting system, a print environment condition obtaining system that obtains the print environment condition at the printer, a print data selecting system that selects one of the plurality of pieces of print data corresponding to the print environment condition obtained by the print environment condition obtaining system from among the plurality of print data stored in the print data storing system, and a print executing system that executes a printing operation in accordance with the one of the plurality of pieces of the print data selected by the print data selecting system.

According to another aspect of the invention, there is provided a printing device that executes a printing operation, in accordance with print data which is created from an image data, on an object. The printing device is provided with a print data storing system that stores a plurality of pieces of print data respectively corresponding to a combination of an environment condition and a print condition with different values of factors therein, the environment condition having at least one factor representing a condition of the environment of the printing device, the print condition having at least one factor representing a condition at which the printing operation is executed, an environment condition measuring system that measures a value of the at least one factor representing a condition of the environment of the printing device, a print condition input system through which the at least one factor representing a condition at which the printing operation is executed is input, a print data selecting system that selects one of the plurality of pieces of print data in accordance with the environment condition measured by the environment condition measuring system and the print condition input through the print condition input system, and a print executing system that executes a printing operation in accordance with the one of the plurality of pieces of the print data selected by the print data selecting system.

According to a furthermore aspect of the invention, there is provided a printing system having a print data creating device and a printing device. The print data creating device is provided with a print data creating system that creates, from image data, a plurality of pieces of print data respectively corresponding to a combination of an environment condition and a print condition with different values of factors therein, the environment condition having at least one factor representing a condition of the environment of the printing device, the print condition having at least one factor representing a condition at which the printing operation is executed, and a print data transmitting system that transmits the plurality of pieces of print data to the printing device. While, the printing device is provided with a print data storing system that stores the plurality of pieces of print data transmitted from the print data creating device, an environment condition measuring system that measures a value of the at least one factor representing a condition of the environment of the printing device, a print condition input system through which the at least one factor representing a condition at which the printing operation is executed is input, a print data selecting system that selects one of the plurality of pieces of print data in accordance with the environment condition measured by the environment condition measuring system and the print condition input through the print condition input system, and a print executing system that executes a printing operation in accordance with the one of the plurality of pieces of the print data selected by the print data selecting system.

According to a further aspect of the invention, there is provided a computer program product comprising computer readable instructions that cause a computer to execute a procedures of creating print data for an inkjet printer, the inkjet printer printing an image on a fabric in accordance with the print data. The procedure includes the steps of (a) storing a plurality of pieces of print data respectively corresponding to a plurality of print environment conditions, the plurality of print environment conditions being defined by at least one factor, which affects a print result, at different values, (b) obtaining the print environment condition at the printer, (c) selecting one of the plurality of pieces of print data corresponding to the print environment condition obtained in the obtaining step from among the plurality of print data stored in the print data storing system, and (d) executing a printing operation in accordance with the one of the plurality of pieces of the print data selected in the selecting step.

Optionally, the print environment condition may include an environment condition which includes a factor representing an environment of the printing device, and the step of obtaining the environment condition may measure the factor representing the environment of the printing device. In this case, the factor representing the environment of the printing device may include at least one of temperature and humidity in the printing device.

Further optionally, the print environment condition may include a print condition, which is setting information representing a condition in which the printing operation is executed, and the step of obtaining the print environment condition may include a step of allowing a user to input the print condition. In this case, the print condition may include at least one of a type of the object, a print resolution at which the printing device print an image, and a print method.

Still optionally, the computer program product may further include a step of instructing execution of the printing operation. The step of obtaining the print environment condition may obtain the print environment condition when the execution of the printing operation is instructed.

Further, the step of selecting the print data may select print data corresponding to the print environment condition that exactly or approximately coincides with the print environment condition obtained in the step of obtaining the print environment condition.

According to a further aspect of the invention, there is provided a computer program product comprising computer readable instructions that cause a computer to execute a procedures of creating print data for an inkjet printer, the inkjet printer printing an image on a fabric in accordance with the print data which is created from an image data. The procedure may include the steps of (a) storing a plurality of pieces of print data respectively corresponding to a combination of an environment condition and a print condition with different values of factors therein, the environment condition having at least one factor representing a condition of the environment of the printing device, the print condition having at least one factor representing a condition at which the printing operation is executed, (b) measuring a value of the at least one factor representing a condition of the environment of the printing device, (c) receiving at least one factor representing a condition at which the printing operation is executed, (d) selecting one of the plurality of pieces of print data in accordance with the environment condition as measured and the print condition as received, and (e) executing a printing operation in accordance with the one of the plurality of pieces of the print data selected in the selecting step.

BRIEF DESCRIPTION OF THE ACCOMPANYING DRAWINGS

Figure 3:
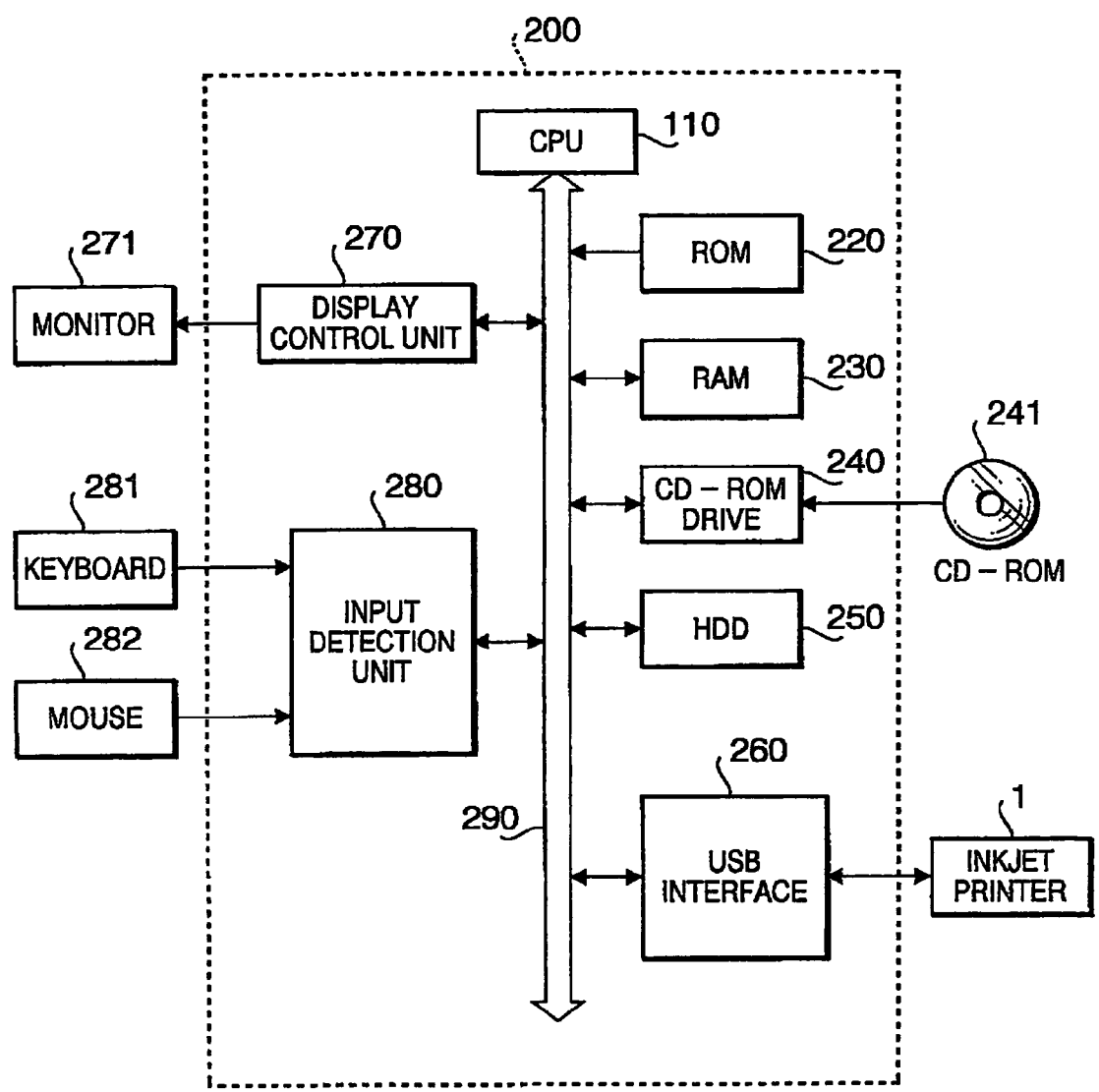
FIG. 3 is a block diagram showing an electrical configuration of a personal computer.
Figure 4:
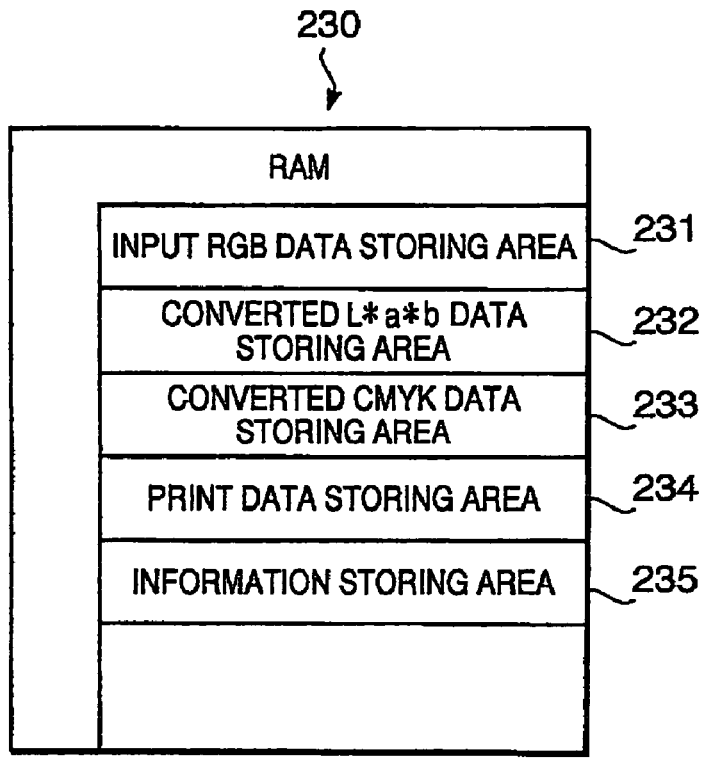
Figure 5:
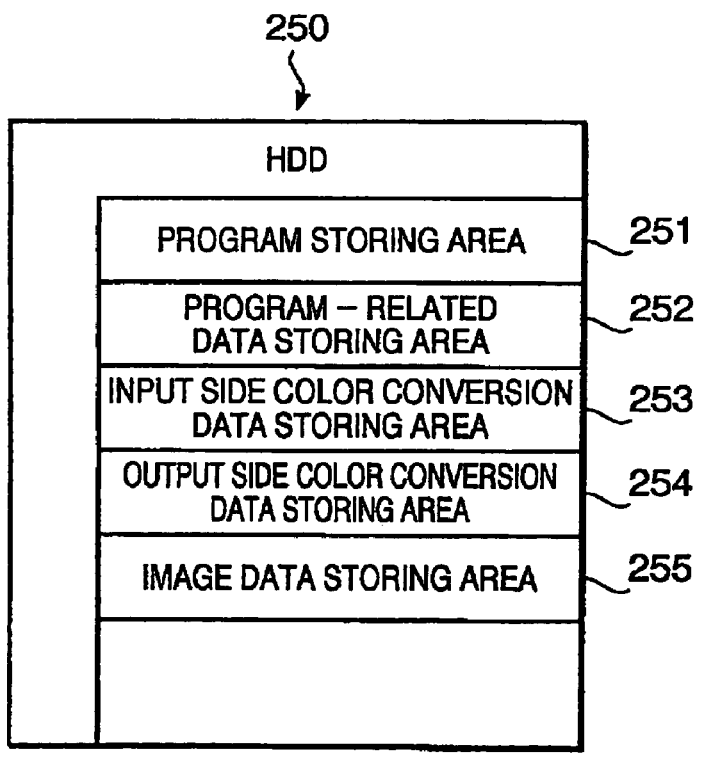
Figure 6:
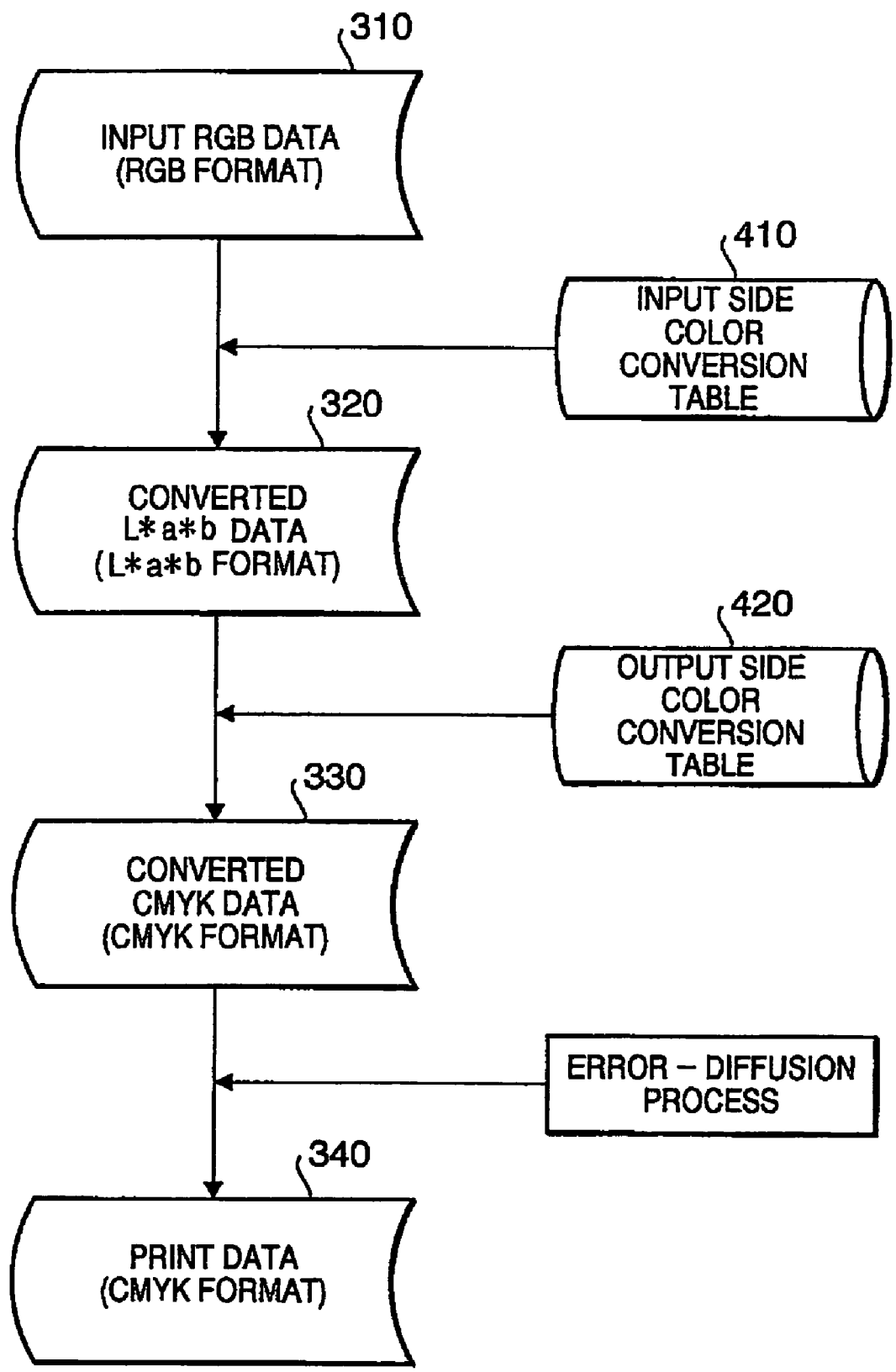
Figure 7:
Figure 8:
Figure 15:
Figure 16:
Figure 19:
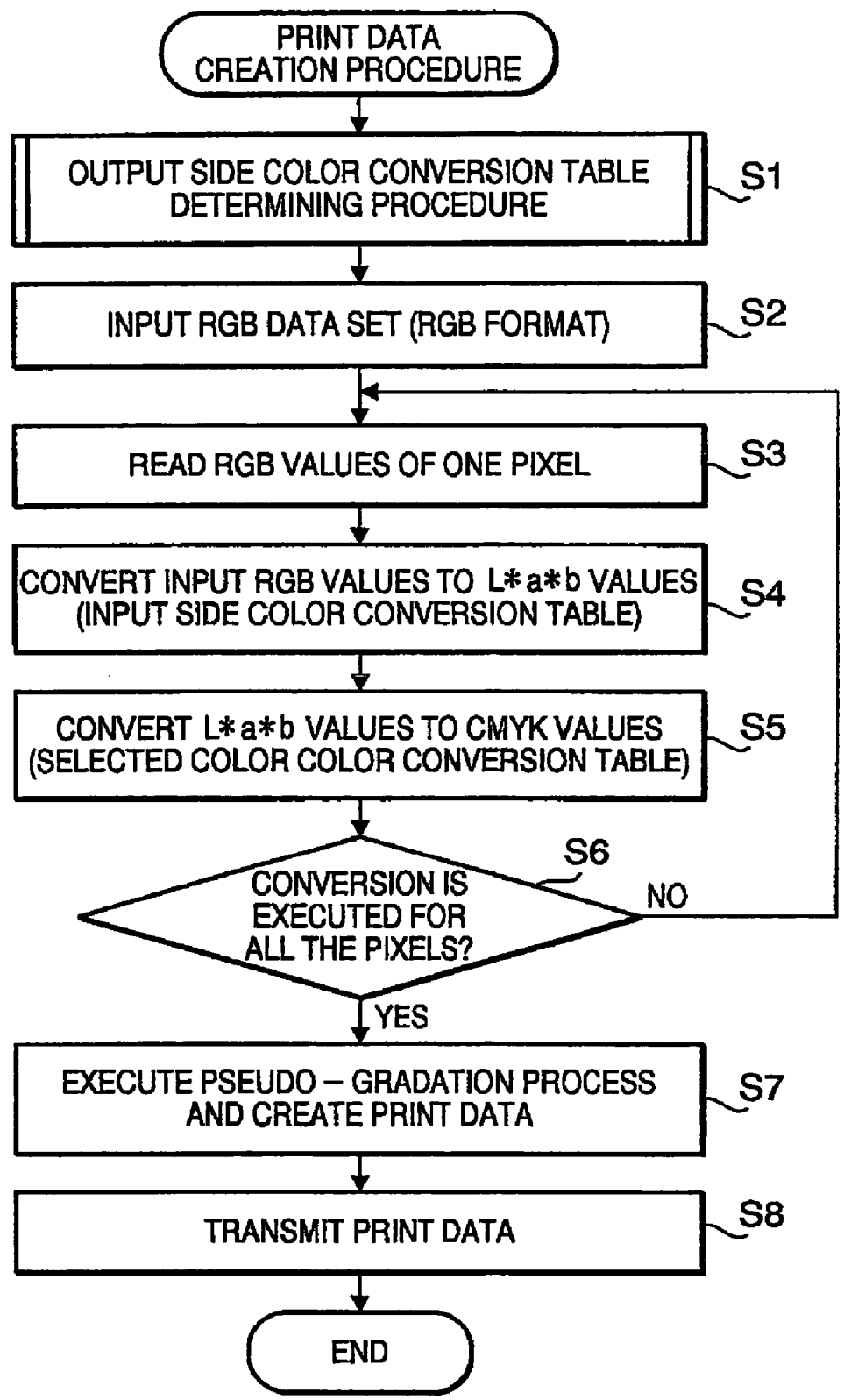
Figure 20:
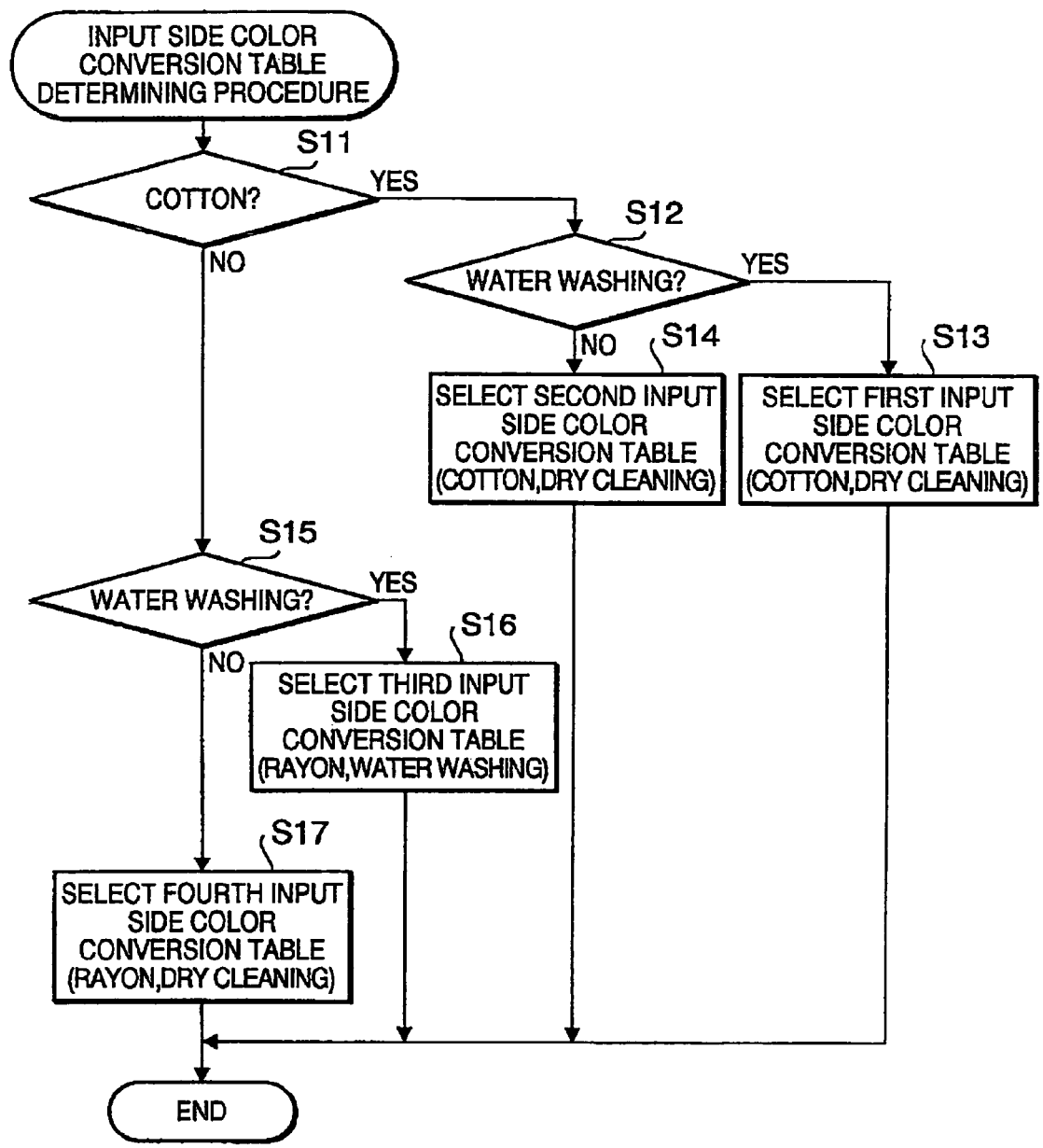
Figure 21:
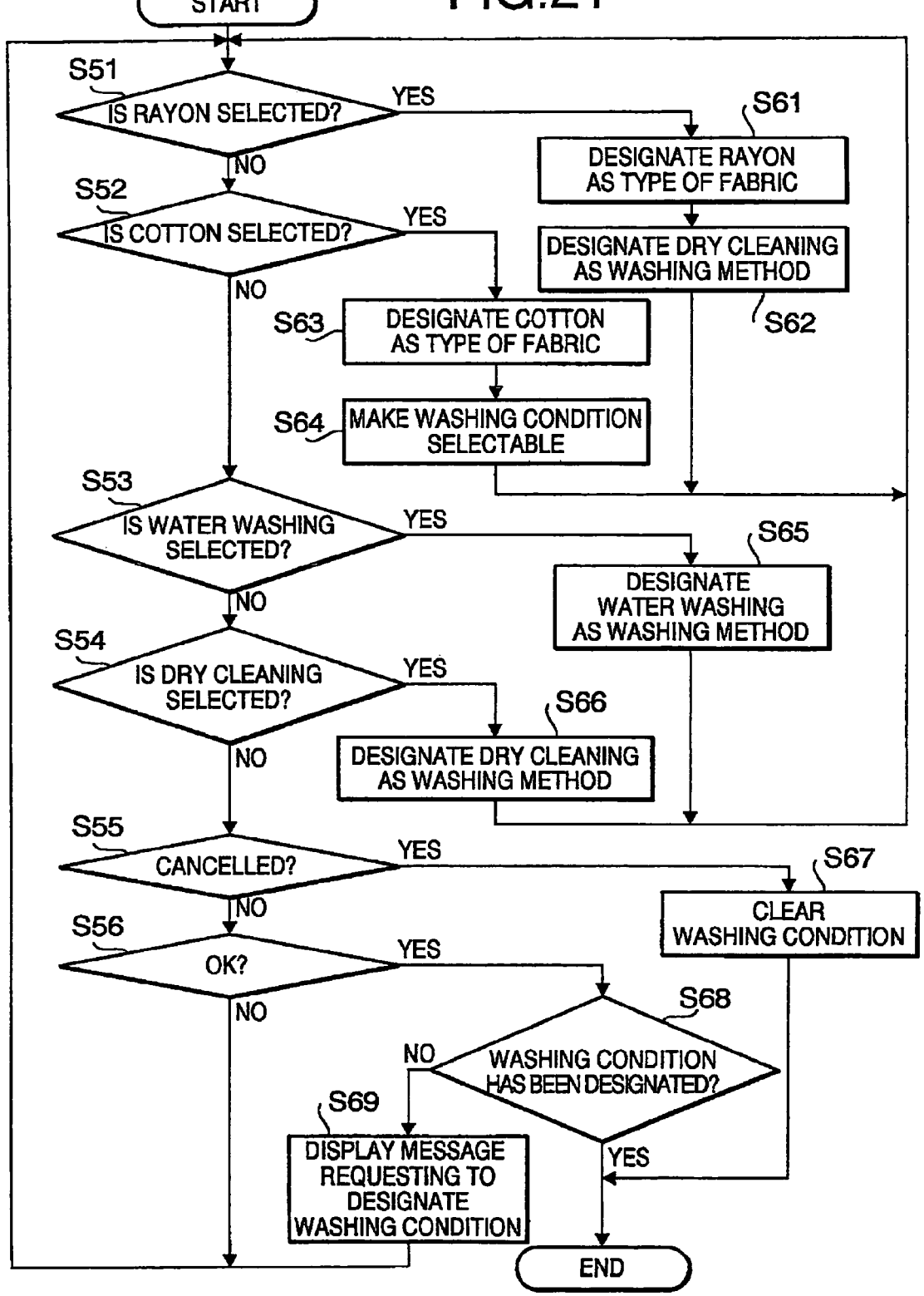
Figure 22:
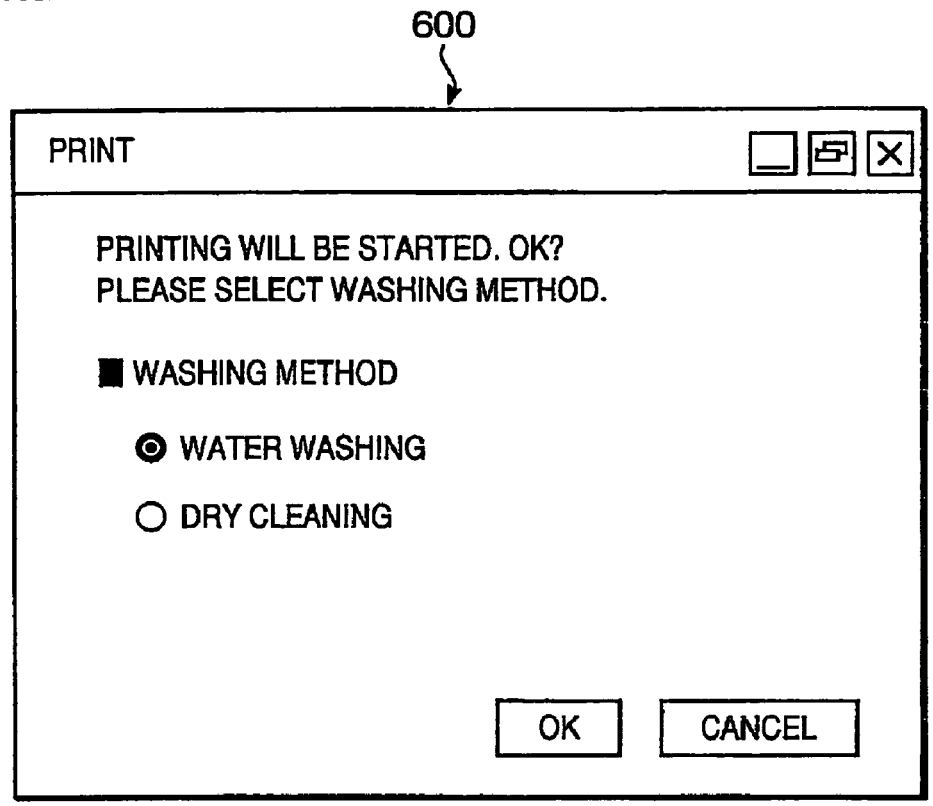
Figure 23:
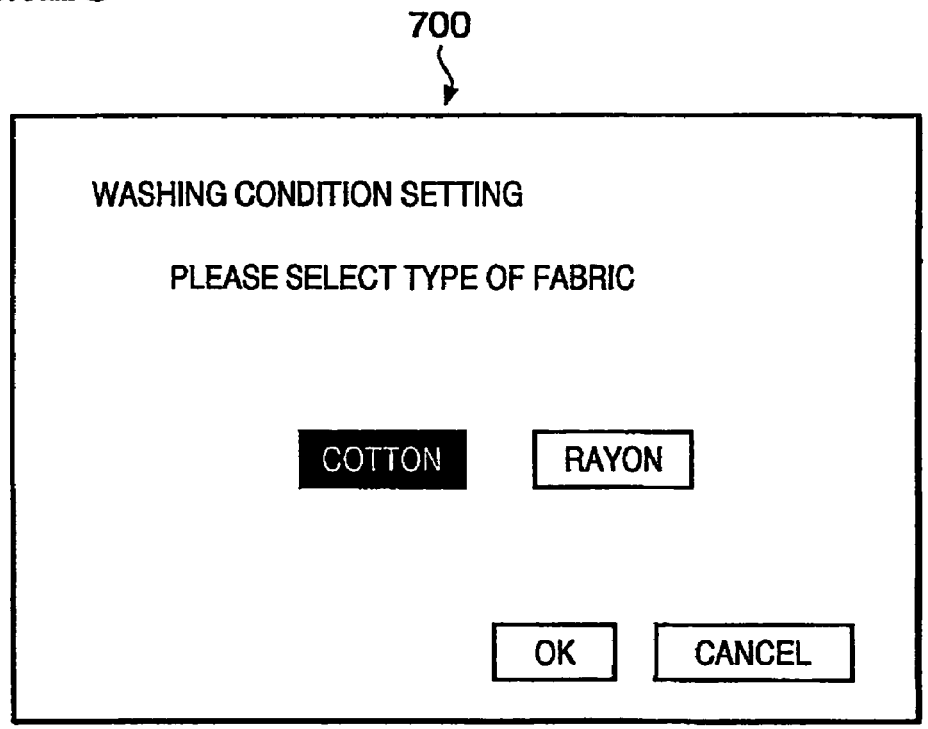
Figure 24:
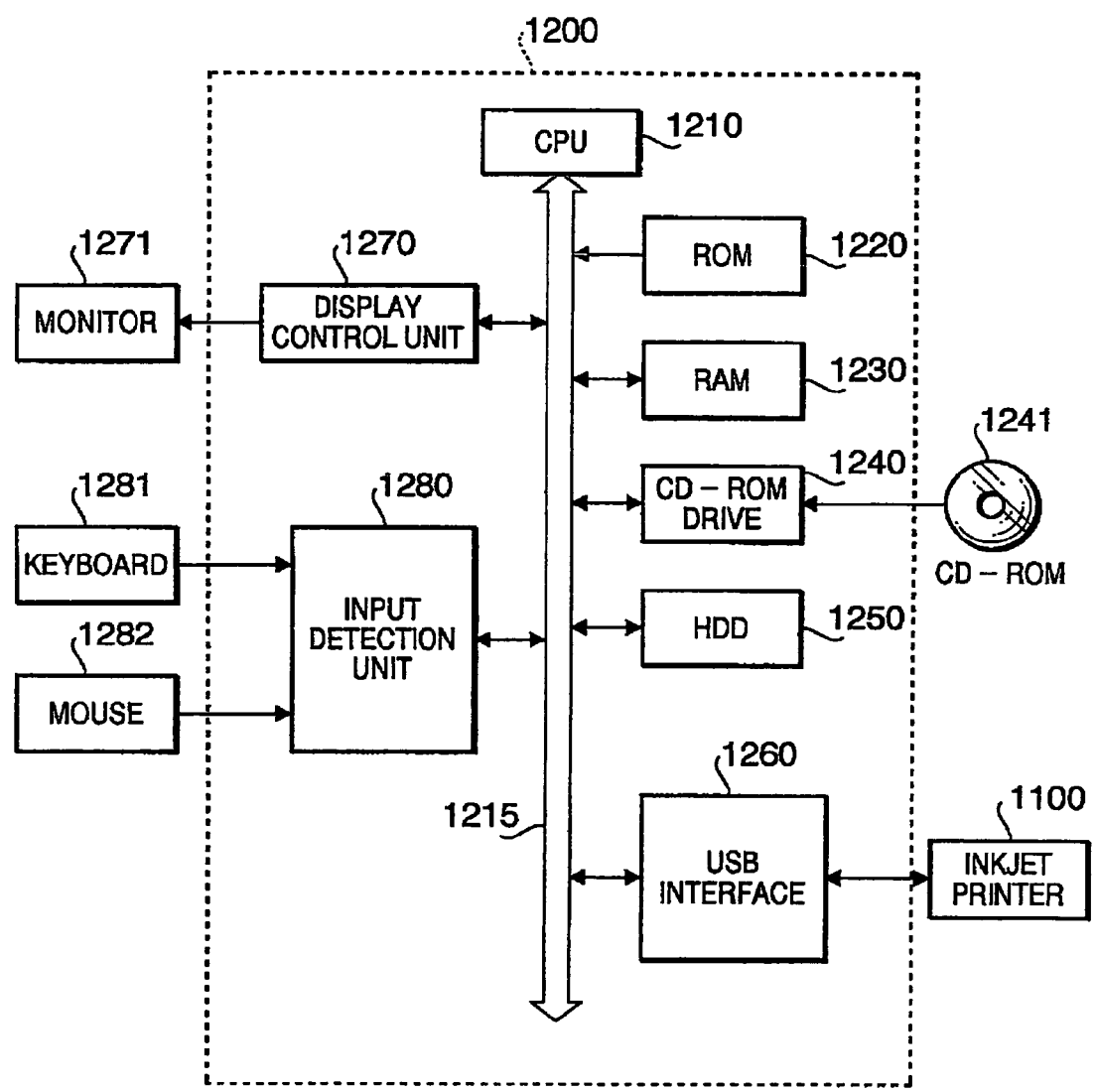
Figure 25:
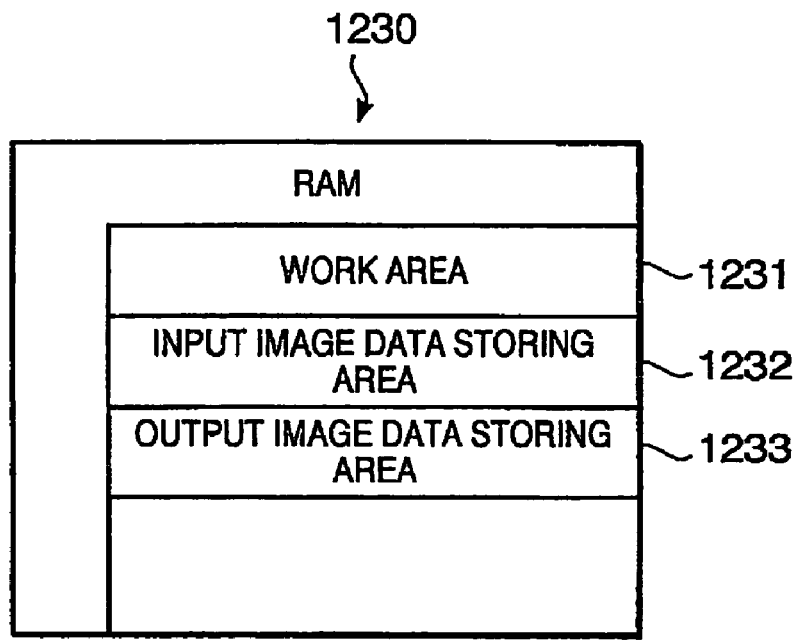
Figure 26:
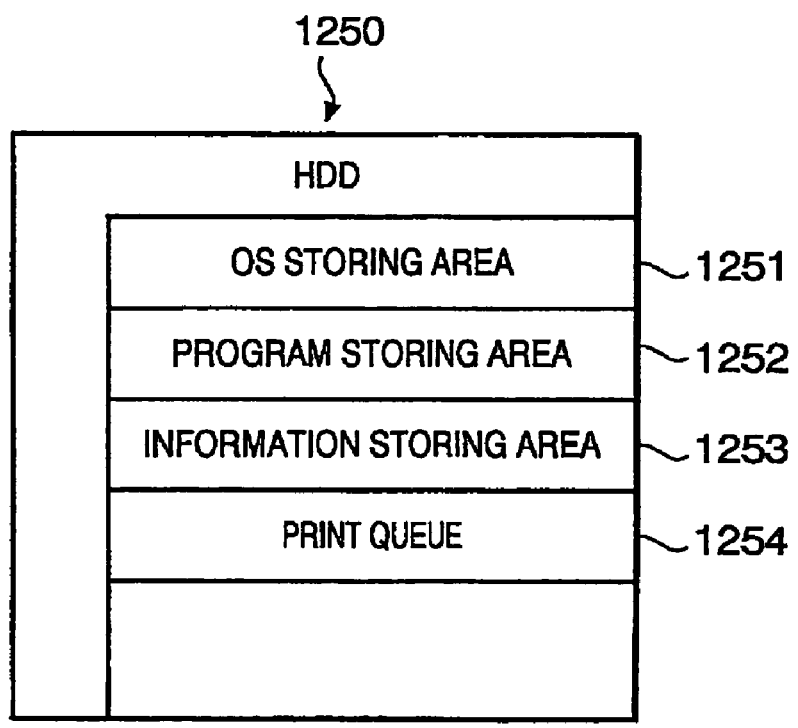
Figure 27:
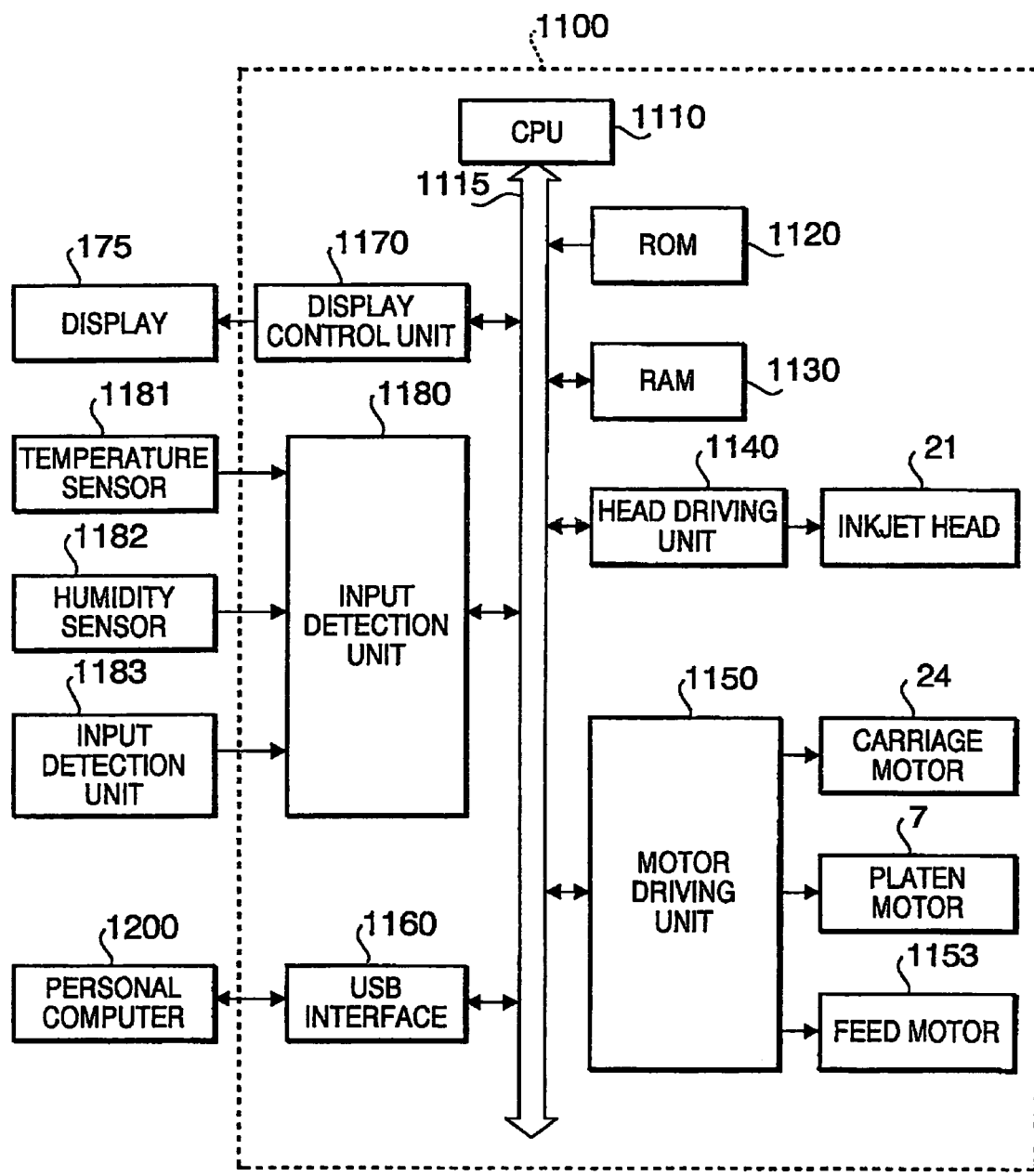
Figure 28:
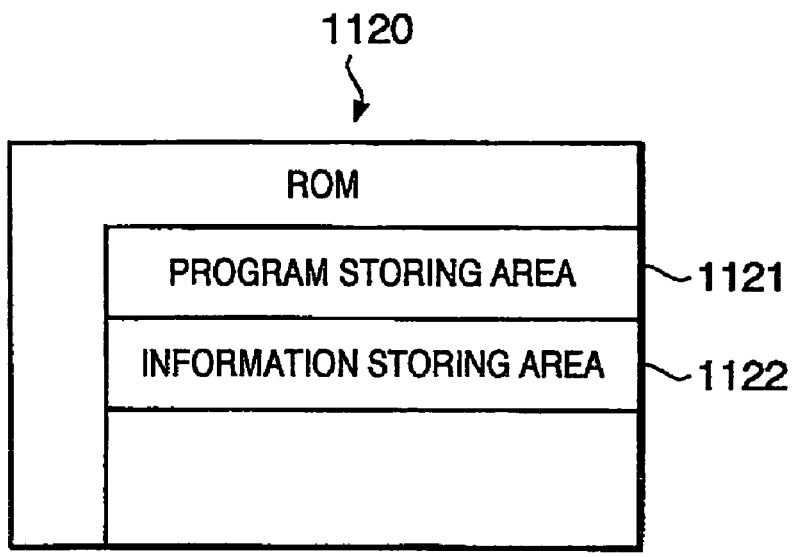
Figure 29:
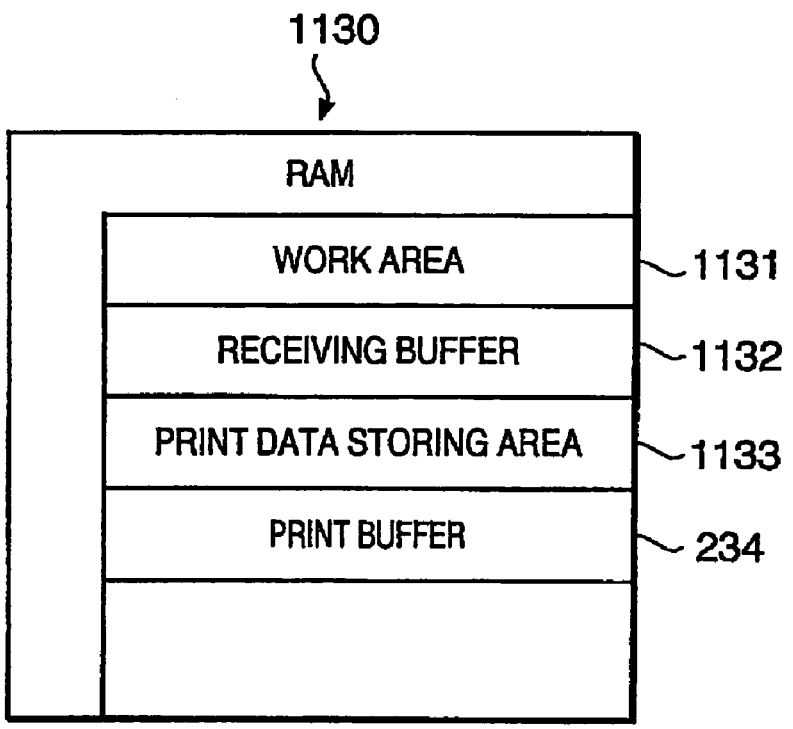
Figure 30:
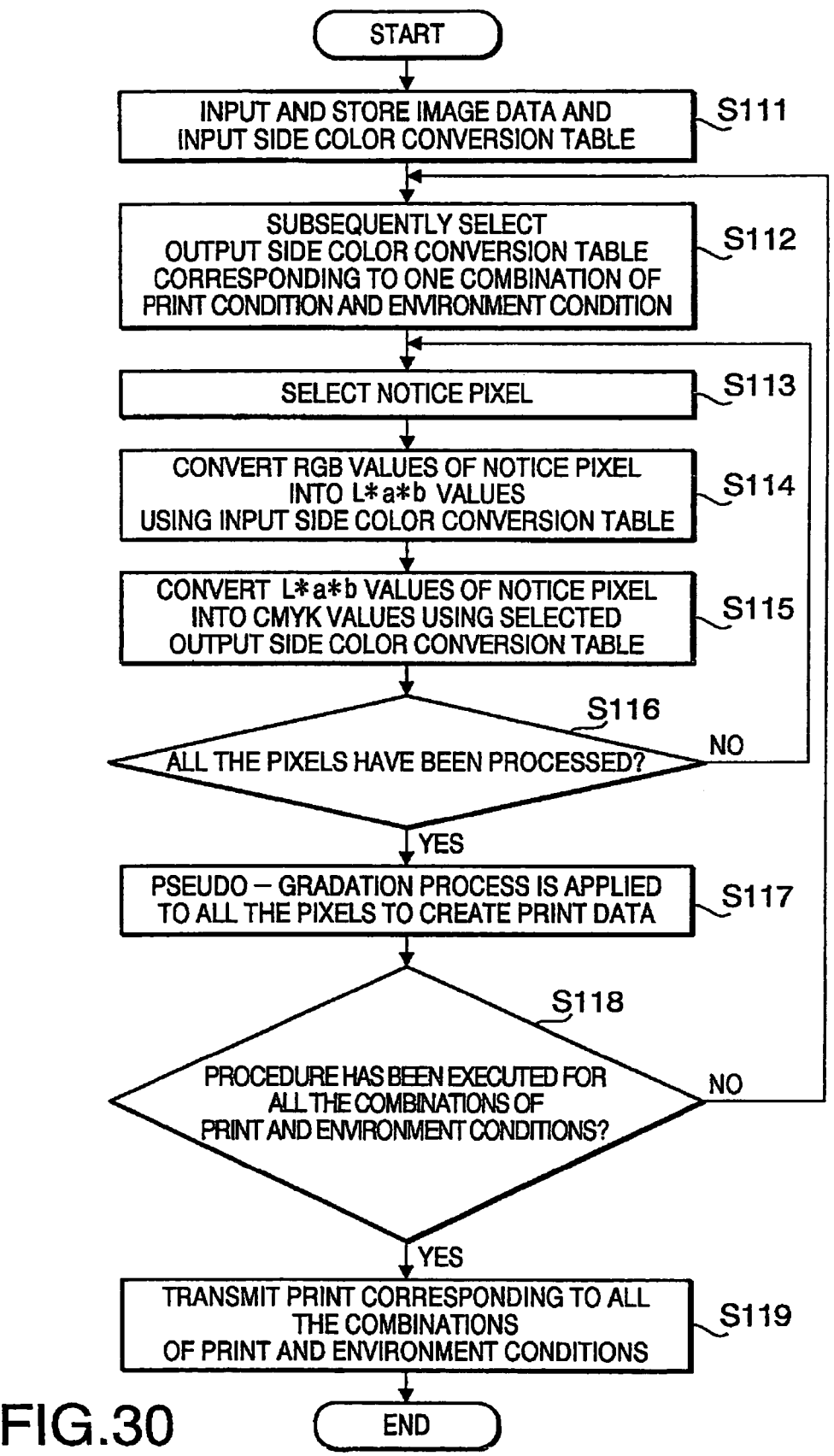
Figure 40:
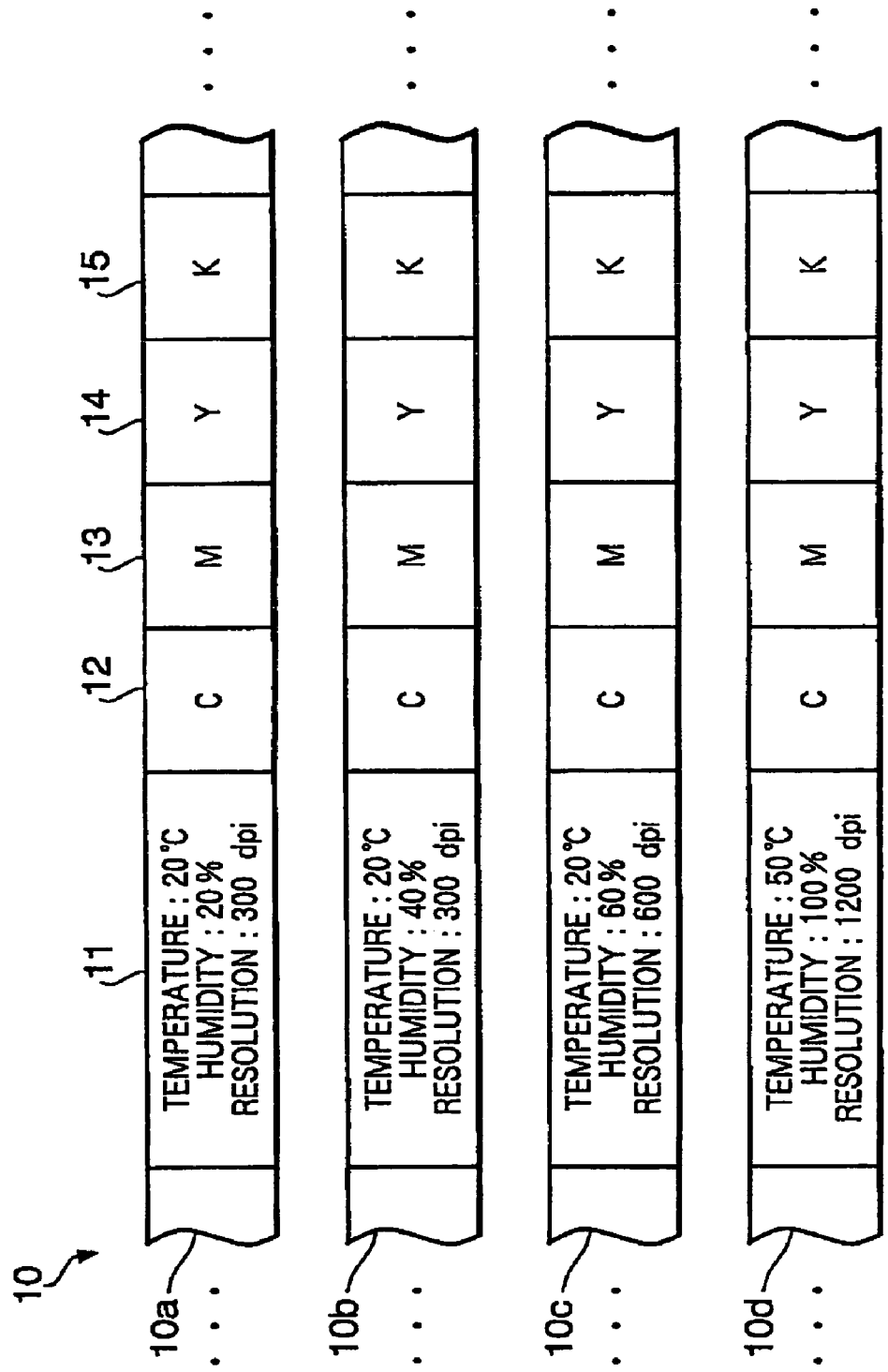
Figure 41:
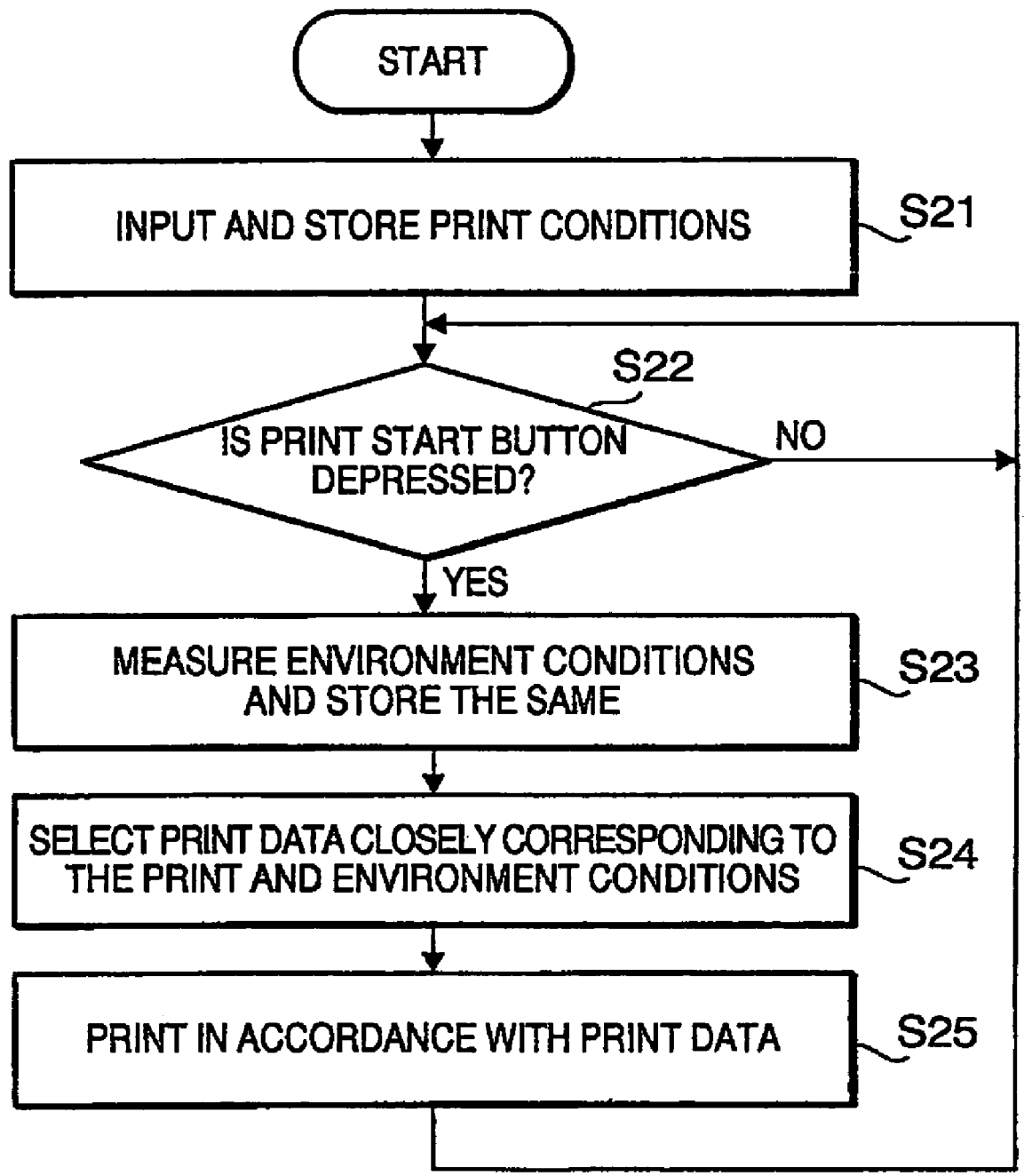
Figure 42:
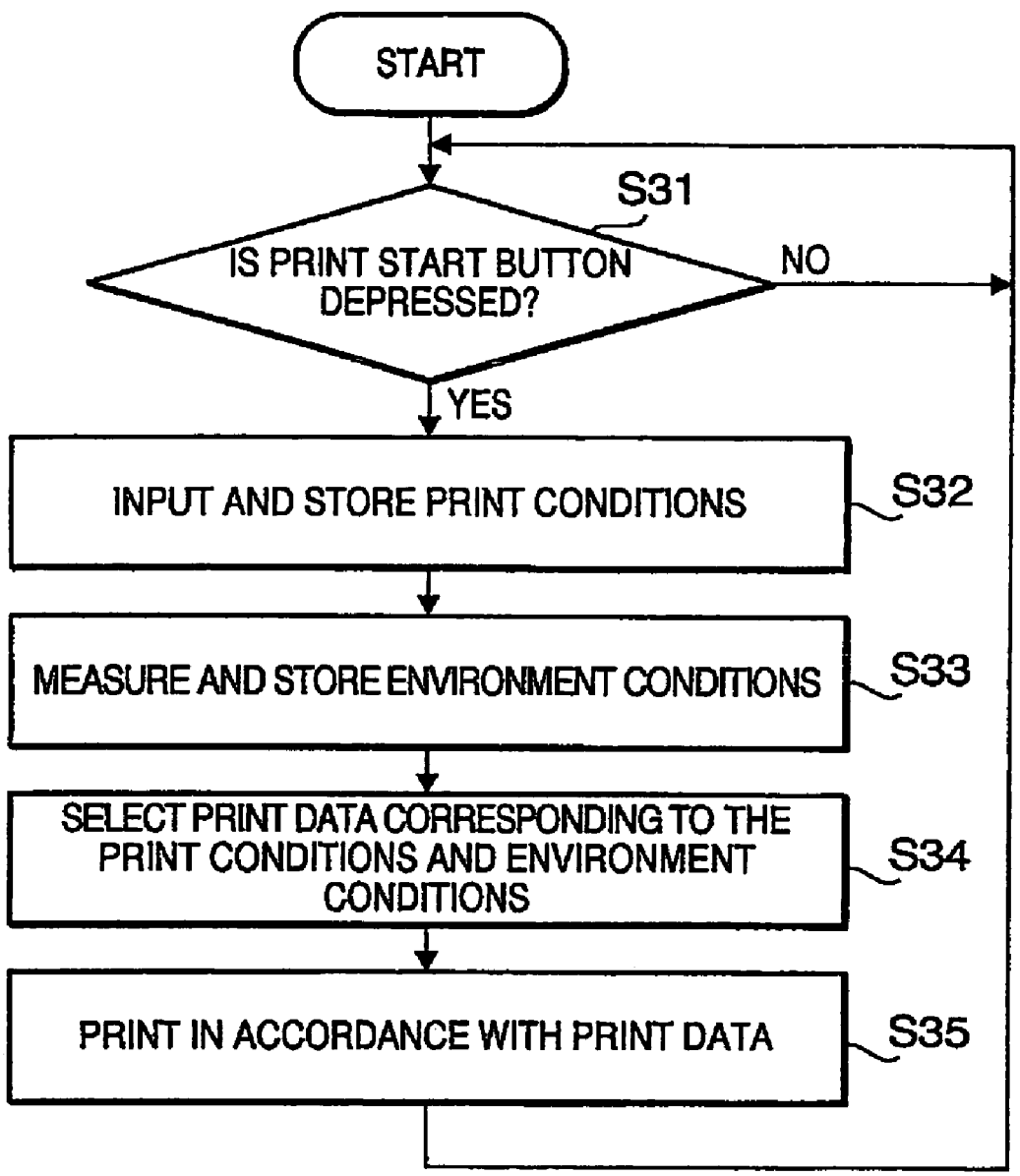
Figure 43:
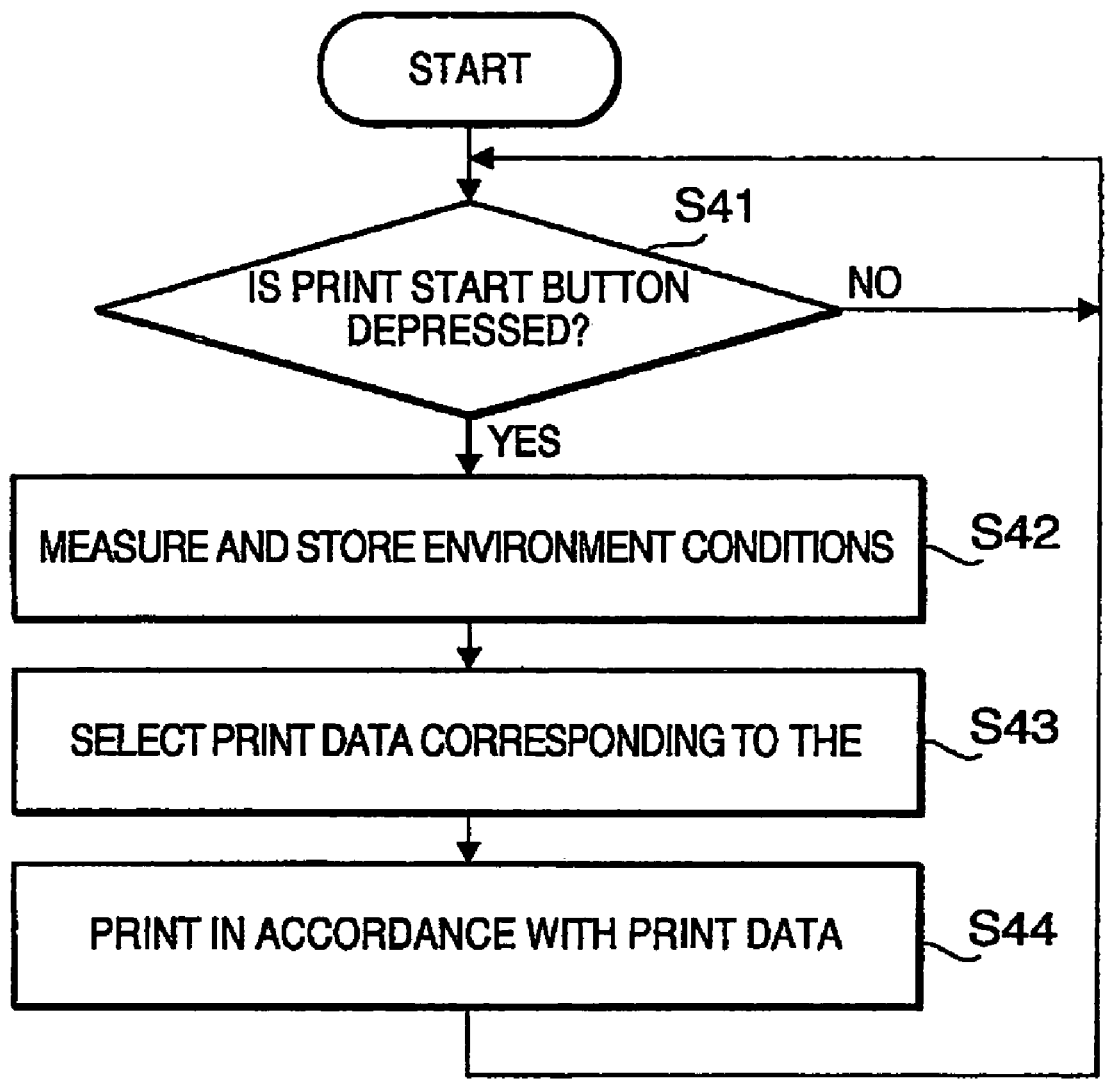

FIG. 4 schematically shows a configuration of a RAM of the personal computer shown in FIG. 3;

FIG. 5 schematically shows a configuration of an HDD of the personal computer shown in FIG. 3;

FIG. 6 shows transition of data when print data is created;

FIG. 7 is a first output side color conversion table;

FIG. 8 is a second output side color conversion table;

FIG. 9 is a third output side color conversion table;

FIG. 10 is a fourth output side color conversion table;

FIG. 11 is input side conversion table;

FIG. 12 shows a data structure of input RGB data;

FIG. 13 shows a data structure of L*a*b* data;

FIG. 14 shows a data structure of CMYK data, which has been converted using the first output side color conversion table;

FIG. 15 shows a data structure of CMYK data, which has been converted using the second output side color conversion table;

FIG. 16 shows a data structure of CMYK data, which has been converted using the third output side color conversion table;

FIG. 17 shows a data structure of CMYK data, which has been converted using the fourth output side color conversion table;

FIG. 18 shows a screen image of a print start dialogue window;

FIG. 19 shows a flowchart illustrating a print data creating procedure;

FIG. 20 shows a flowchart illustrating a output side color conversion table determining procedure, which is called in the print data creating procedure;

FIG. 21 is a flowchart illustrating an input accepting procedure;

FIG. 22 is a screen image of a print start dialogue window;

FIG. 23 is a screen image of a washing condition setting dialogue window;

FIG. 24 is a block diagram showing a configuration of a personal computer;

FIG. 25 schematically shows a configuration of a RAM of the personal computer shown in FIG. 24;

FIG. 26 schematically shows a configuration of an HDD of the personal computer shown in FIG. 24;

FIG. 27 is a block diagram showing a configuration of an inkjet printer;

FIG. 28 schematically shows a configuration of a ROM of the inkjet printer shown in FIG. 27;

FIG. 29 schematically shows a configuration of a RAM of the inkjet printer shown in FIG. 27;

FIG. 30 is a flowchart illustrating a print data creating procedure;

FIG. 31 shows a correspondence between a printing environment and output side color conversion table;

FIG. 32 shows an example of print data for C (cyan) component;

FIG. 33 shows an example of print data for M (magenta) component;

FIG. 34 shows an example of print data for Y (yellow) component;

FIG. 35 shows an example of print data for K (black) component;

FIG. 36 shows another example of print data for C (cyan) component;

FIG. 37 shows another example of print data for M (magenta) component;

FIG. 38 shows another example of print data for Y (yellow) component;

FIG. 39 shows another example of print data for K (black) component;

FIG. 40 shows an example of a print data group;

FIG. 41 is a flowchart illustrating a printing procedure according to a second embodiment;

FIG. 42 is a flowchart illustrating a printing procedure according to a third embodiment; and FIG. 43 is a flowchart illustrating a printing procedure according to a fourth embodiment.

DETAILED DESCRIPTION OF THE EMBODIMENTS

Hereinafter, referring to the accompanying drawings, embodiments of the present invention will be described.

First Embodiment

Figure 1:
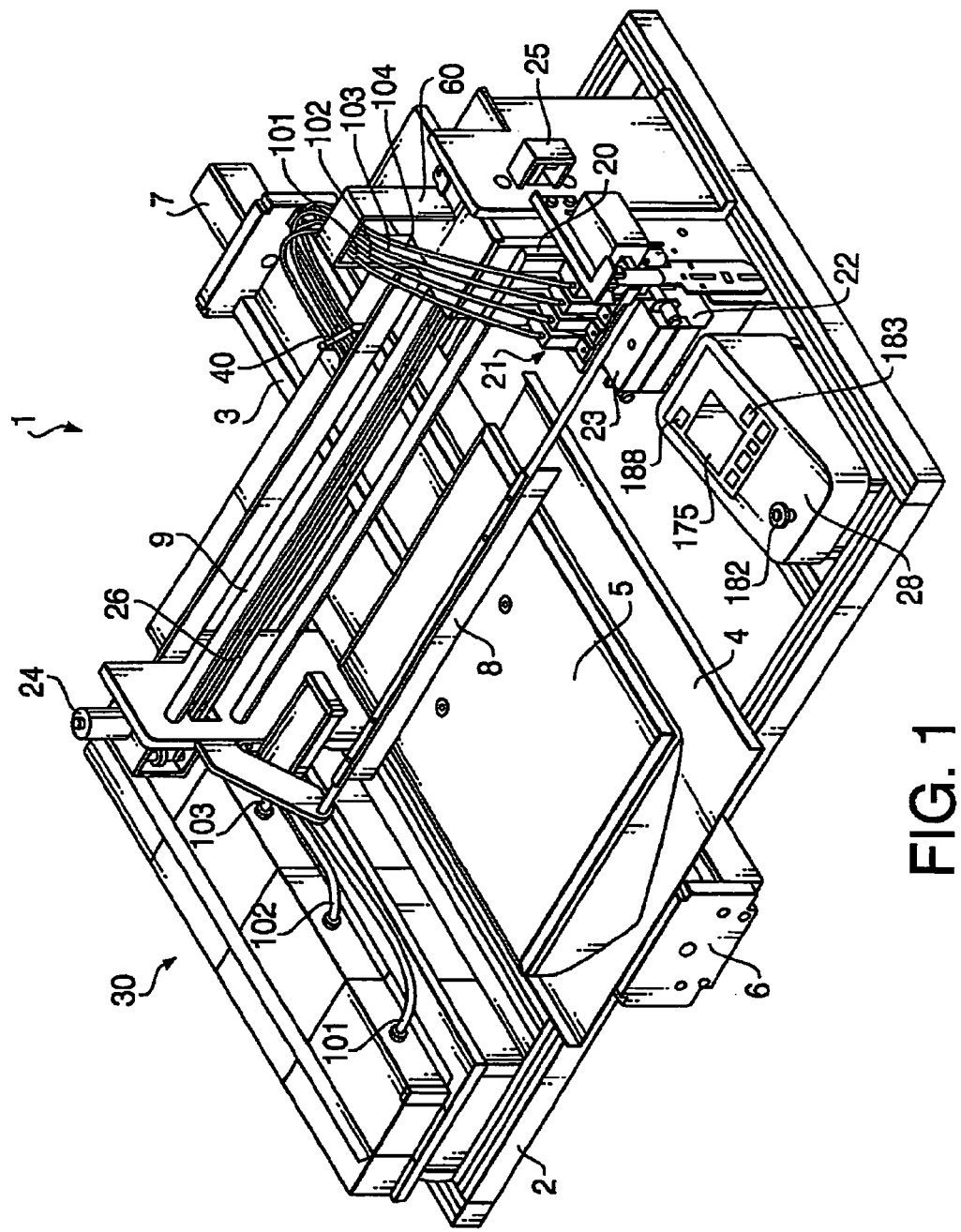
FIG. 1 is a perspective view showing an entire structure of an inkjet printer.
Figure 2:
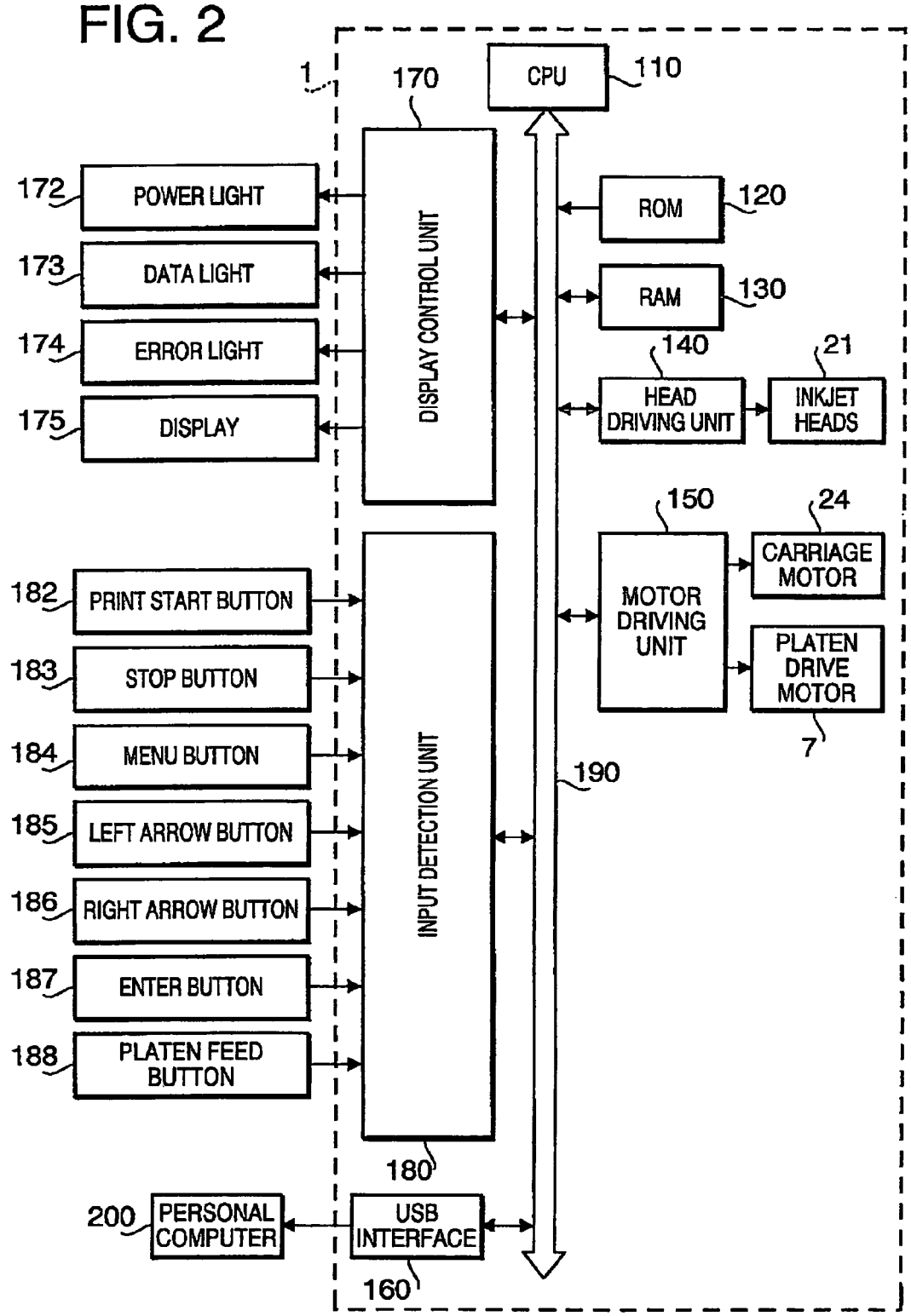
FIG. 2 is a block diagram showing an electrical configuration of the inkjet printer shown in FIG. 1.

Initially, a print data creating device according to a first embodiment of the invention will be described. FIG. 1 is a perspective view showing an entire structure of an inkjet printer 1 and FIG. 2 is a block diagram showing an electrical configuration of the inkjet printer 1. According to a first embodiment, the inkjet printer 1 is for printing images on fabrics such as a T-shirt. FIG. 3 is a block diagram showing an electrical configuration of a personal computer (PC) 200. The PC 200 creates print data, which is transmitted to the inkjet printer 1. Then, the inkjet printer prints images on the fabrics in accordance with the transmitted print data.

As described above, when an image is printed on an object such as a fabric (e.g., a T-shirt), it will be washed after the image has been printed thereon. In such a case, color-dulling may occur. Additionally, depending on a type of the fabric, a condition of a surface changes (e.g., shagging occurs/suppressed), which results in the appearance of the fabric in terms of the color of the printed image. Thus, the resultant image becomes different from a result expected before in terms of its color. According to the first embodiment, the print data is created such that the image formed on the object (i.e., fabric) looks as desired after it has been washed.

Firstly, the inkjet printer 1 that prints images on the fabric such as the T-shirts will be described with reference to FIG. 1, which is a perspective view showing structure of the inkjet printer 1 schematically.

As shown in FIG. 1, the inkjet printer 1 has a housing 2 having a shape of rectangular solid having a longer side extending in a right-and-left hand direction in FIG. 1. At a substantially central portions on a bottom surface of the housing 2, a pair of rails 3 extending in a font-to-rear direction are arranged parallel to each other. The pair of rails 3 are supported on a base (not shown) which is formed to project vertically. The pair of rails 3 mount a platen support (not shown), which is a plate member. The platen member is slidable in the front-and-rear direction along the pair of rail 3. At a central portion of the platen support, a supporting rod (not shown) protrudes vertically, and a platen 5 is secured at the upper end of the supporting rod. It should be noted that the platen 5 is exchangeable.

The platen 5 is, when viewed from the top, a substantially rectangular plate member having a longer side extending in the front-and-rear direction of the housing 2. On an upper surface of the platen 5, an object (fabric: such as the T-shirt) is placed horizontally. On the upper surface of the platen 5, an anti-slip member (not shown) is provided to maintain a tense condition of the object, and to prevent the object from shifting during the printing operation. A tray 4, which is secured to the supporting rod, is provided substantially at an intermediate position between the platen 5 and the platen support. The tray 4 has a bottom surface which is substantially parallel with the upper surface of the platen 5. When viewed from the top, the outer periphery is larger than the outer periphery of the platen 5. The tray 4 is provided to protect the object such that, when the object (e.g., T-shirt) is placed on the platen 5, part of the object (e.g., a sleeve of the T-shirt etc.) is prevented from reaching the bottom surface of the housing.

On a rear side end portion of a platen driving mechanism 6 provided with the pair of rails 3 that slidably mount the platen support, a platen driving motor 7 is provided. By actuation of the platen driving motor 7, the platen support moves in the front-and-rear direction of the housing, guided by the pair of rails 3. Specifically, between a driving shaft of the platen driving motor 7 and a pulley (not shown) provided in the vicinity of the front ends of the rails 3 (i.e., the ends of the rails 3 on the front end side of the housing 2), a driving belt (not shown) is wound, the platen support being secured to the driving belt. Thus, when the platen driving motor 7 is actuated and the driving shaft thereof rotates, the driving belt moves, and the platen support secured to the belt moves as guided by the pair of rails 3, in the front-and-rear direction of the housing 2.

Further, a guide rail 9 is provided so as to be bridged between left-hand side wall and right-hand side wall (not shown) of the housing 2, at a substantially central position in the front-and-rear direction of the housing 2 and above the platen 5. A carriage motor 24 is provided in the vicinity of the left-hand side end of the guide rail 9. A pulley 25 is provide in the vicinity of the right-hand side end of the guide rail 9, and a carriage belt 26 is wound between a driving shaft of the carriage motor 24 and the pulley 25. As shown in FIG. 2, the carriage belt 26 extends in the right-and-left direction of the housing 2, below the guide rail 9. A rear surface of the carriage 20 is secured to the carriage belt 26. Further, on the rear surface of the carriage, an engaging section which slidably engages with the guide rail 9 is formed. The right-and-left movement of the carriage 20 is guided by the guide rail 9. Accordingly, when the carriage motor 24 is driven, the carriage 20 is moved in the right-and-left direction of the housing 2 as guided by the guide rail 9. In this embodiment, the carriage motor 24 is a DC motor. A well-known linear encoder (not shown) is provided to the guide rail 9, and a position in the right-and-left direction of the carriage 20 is detected using the linear encoder.

The inkjet printer 1 uses the cyan ink, magenta ink, yellow ink and black ink. On a left-hand side surface of the inkjet printer 1, four ink cartridge containers 30 are provided. The black, cyan, magenta and yellow ink cartridges are detachably accommodated in the four ink cartridge containers 30, respectively.

To the four ink cartridge containers 30, ink supply tubes 101, 102, 103 and 104 are respectively connected. The ink supply tubes 101-104 run in the housing 2 though a guide member 40 and a tube supporting member 60, and are connected to inkjet heads 21 for respective color components. The ink supply tubes 101-104 are flexible tubes made of resin (e.g., polyethylene) so that each of can easily be bent or twisted as the carriage 20 moves. The guide member 40 is located at substantially intermediate position in the right-and-left direction of the housing 2 and above the platen 5, and supports the four ink supply tubes 101-104 as shown in FIG. 1. The tube supporting member 60 is provided on the upper surface of the carriage 20 to support the four ink supply tubes 101-104.

On the carriage 20, four inkjet heads 21 are mounted. Each of the inkjet heads 21 has 128 ejection channels (not shown) through which the ink is ejected. To the ejection channels, piezoelectric actuators (not shown) are provided, respectively. The piezoelectric actuators are driven individually so that drops of ink are ejected downward from minute ink ejection nozzles provided on the lower surface of the inkjet heads 21, respectively.

At a position, inside the housing 2, corresponding to the right-hand side end portion of the guide rail 9, a purge unit 22 is provided. The purge unit 22 has suction caps 23 which can be closely contacted or spaced away with respect to the nozzle surfaces of the inkjet heads 21, respectively. The purge unit 22 includes a suction pump (not shown), and when the suction caps 23 closely contact the inkjet heads 21, suction of the ink through the suction caps 23 can be performed. Additionally, when the printing operation is not carried out, the suction caps 23 cover the nozzle surfaces of the inkjet heads 21 to prevent the ink from being dried.

At a position in front of the guide rail 9, a clearance sensor 8 extending in the right-and-left direction of the housing 2 is provided. The clearance sensor 8 functions, when the platen 5 moves along the pair of rails 3 in the front-to-rear direction, to detect wrinkles of the substrate placed on the platen 5 and/or obstacles such as dust.

On the right-front side portion of the housing 2, an operation panel 28 for operating the inkjet printer 1 is provided. FIG. 2 shows a top view of the operation panel 28 of the inkjet printer 1. The operation panel 28 is provided with a display 174, a print start button 182, a stop button 183 and a platen feed button 188. When the platen feed button 188 is depressed, the platen 5 is moved to a position where the object, or the fabric such as the T-shirt can be placed or removed therefrom. When the print start button 182 is depressed, the inkjet printer 1 starts printing in accordance with the data received from the PC 200. When the stop button 183 is depressed, the printing operation is interrupted.

Next, referring to FIG. 2, an electrical configuration of the inkjet printer 1 will be described. FIG. 2 is a block diagram showing the electrical configuration of the inkjet printer 1. As shown in FIG. 2, the inkjet printer 1 includes a CPU (Central Processing Unit) 110 that controls the entire operation of the inkjet printer 1. Via a bus 190, the CPU 110 is connected with a ROM 120 storing control programs to be executed by the CPU 110, and a RAM 130 temporarily storing various data.

Further, the CPU 110 is connected, via the bus 190, a head driving unit 140, a motor driving unit 150 and a USB (Universal Serial Bus) interface 160. The head driving unit drives piezoelectric actuators (not shown) respectively provided to the ejection channels of the inkjet heads 21. The motor driving unit 150 the carriage motor 24 that drives the carriage 20 mounting the inkjet heads 21, and the platen driving motor 7 that drives a platen roller (not shown), which controls speed and timing of driving of the platen 5 for holding the object (e.g., fabric such as the T-shirt). The USB interface 160 enables the inkjet printer 1 to perform a data communication with external devices including the personal computer 200, which are connected to the inkjet printer 1 through a USB cable (not shown).

The operation panel 28 is provided with a power light 172 and a data light 173, an error light 174 as well as the display 175. A display controller 170 that controls the operation of the display 175, power light 172, data light 173 and the error light 174 is connected to the CPU 110 via the bus 190. Further, the operation panel 28 is further provided with a menu button 184, a left arrow button 185, a right arrow button 186 and an enter button 187, and an input detection unit 180 that detects the status of the above-described buttons is connected to the CPU 110 via the bus 190. On the display 175, information related to the print data (e.g., a data file name and a file size of the print data, which is being received from the PC 200, printing of which is being waited, which is being printed or which has been printed. Further, on the display 175, a menu (not shown) to be used to input various settings. When an error has occurred, a content of the error is displayed on the display 175. Further, when the menu button 184 is depressed, a menu selecting dialogue is displayed on the display 175. When the left arrow button 185 is operated, a cursor is moved leftward, while when the right arrow button 186 is operated, the cursor is moved rightward. When the enter button 187 is depressed, an item selected by the cursor is established as the selected item.

The ROM 120 has a program storage area for storing control programs of the inkjet printer 1 and print execution program to execute the printing operation, and an information storage area for storing settings and initial values necessary to execute respective programs and various data.

The RAM 130 has a received data storage area for storing the print data received form the external device (e.g., the personal computer 200), a current data storage area for storing the print data currently being processed (printed), and a setting information storage area for storing various setting information.

Next, referring to FIGS. 3 through 5, the PC 200 will be described. FIG. 3 is a block diagram showing an electrical configuration of the PC 200. FIG. 4 schematically shows storing areas of a RAM 230 of the personal computer 200, and FIG. 5 schematically shows storing areas of an HDD (Hard Disk Drive) 250 of the personal computer 200.

The personal computer 200 is connectable to the inkjet printer 1 via a communication cable, such as the USB cable, according to a predetermined communication standard. According to the first embodiment, print data is generated based on image data created with graphic software, scanned by a scanner, captured by a digital camera etc., and the thus generated print data is transmitted from the personal computer 200 to the inkjet printer 1.

As shown in FIG. 3, the personal compute 200 has a CPU 210, and the ROM 220, the RAM 230, a CD-ROM drive 240, the HDD 250, a USB interface 260, a display control unit 270 and an input detection unit 280 are connected to the CPU 210 via a bus 290.

The ROM 220 stores programs including BIOS to be executed by the CPU 210. The RAM 230 temporarily stores various data. The CD-ROM drive 240 is used when data is retrieved from a CD-ROM 241. The HDD 250 is used for storing various data. The USB interface 260 enables the personal computer 200 to perform data communication with other devices including the inkjet printer 1. The display control unit 270 controls the monitor 271, on which an operation screen is displayed. The input detection unit 280 is connected with a keyboard 281 and a mouse 282, through which the user can input commands and the like. Although not indicated in FIG. 3, the personal computer 200 is provided with a floppy® disk drive, a sound I/O (input/output) unit, and various interfaces.

According to the first embodiment, in the CD-ROM 241, a print data creating program, and settings and data when the print data creating program is executed are stored. When necessary, the print data creating program and the settings and data are retrieved from the CD-ROM 241 and stored in a program storing area 251 and program-related data storage area 252 of the HDD 250 (see FIG. 5). It should be noted that the print data creating program and data therefor are not limited to those stored in the CD-ROM 241. Such a configuration is only an exemplary one, and the program and data may be stored in another storage medium such as the floppy® disk or MO (Magneto-Optical disk), or may be obtained through a network such as the Internet if the personal computer 200 is connectable to such a network.

FIG. 4 shows a configuration of the RAM 230. The RAM 230 includes an input RGB data storing area 231 which temporarily stores input RGB data from which the print data is created, a converted L*a*b* data storing area 232 that stores the L*a*b* data which has been converted from the input RGB data, a CMYK data storing area 233 that stores the CMYK data which has been converted from the L*a*b* data, a print data storing area 234 that stores the print data which has been created from the CMYK data, and an information storing area 235 which temporarily stores data during execution of various programs. Although not shown in FIG. 4, further areas for storing various data are provided in the RAM 230.

As shown in FIG. 5, the HDD 250 has a program storing area 251 that stores various programs to be executed in the PC 200, including the print data creating program, a program-related data storage area 252 that stores various settings, initial values and data necessary of executing the programs, an input side color conversion table storing area 253 that stores a color conversion table used to convert the RGB data to the L*a*b* data, an output side color conversion table storing area 254 that stores a color conversion data used to convert the L*a*b* data to the CMYK data, and an image data storing area that store the image data. Although not show, further areas that store various data are provided in the HDD 250.

When the print data creating program is executed in the PC 200 and the print data is transmitted to the inkjet printer 1. Then, when the inkjet printer 1 receives the print data from the PC 200, and when the user sets the fabric (e.g., the T-shirt) to the platen 5 and depresses the print start button 182, the platen 5 is moved, along the pair of rails 3, toward the rear side of the housing 2 as the platen driving motor 7 is actuated. Then, while the carriage 20 is moved from the right-hand side to the left-hand side of the housing 2, the inkjet heads 21 eject ink drops in accordance with the print data to form a line of image on the fabric. Then, the platen 5 is fed forward in the housing 2 by one line amount, and the carriage 20 is moved from the left-hand side to the right-hand side of the housing 2. During this movement, the inkjet heads 21 eject the ink drops in accordance with the print data to form another line of image. Then, the platen 5 is fed forward by another line amount. Similar process as above is repeated to form the image line by line on the fabric (e.g., T-shirt). When the print operation is finished, the platen 5 is fed to a position where the fabric can be removed from the platen 5. Accordingly, when the print operation is finished, the user can remove the fabric easily from the platen 5.

Expression of color in the PC 200 and the inkjet printer I will be described in detail. In order to display colors on the monitor 271 of the PC 200, each pixel of an image is expressed in accordance with an RGB format. The RGB format expresses a color using three primary colors of light, i.e., R (red), G (green) and B (blue) values. In many cases, image data generated inside the PC 200 using graphic software and image data captured by image scanner or digital camera expresses the color in accordance with the RGB format.

On the other hand, when the image is printed by ejecting the inks as is done by the inkjet printer 1, a color is expressed in accordance with the CMYK format, which uses three primary colors, C (cyan), M (magenta), Y (yellow) values and K (black) value for expressing a color. In order to print an image based on the print data according to the CMYK format, the inkjet printer 1 uses the cyan, magenta, yellow and black inks. The C, M, Y and K values represent the ejected amount of the C, M, Y and K inks, respectively.

As is appreciated from the above, in order to print the image displayed on the monitor 271 of the PC 200 with the inkjet printer 1, the image data of RGB format should be converted into print data of CMYK format. For this conversion, a color expression using L*a*b* values is used as intermediate data. The L*a*b* value format expresses a color with L* value, a* value and b* value. The L* value represents a brightness value. The a* value represents degree of a change of a color from red to green, and a larger value indicates the red is stronger, while the smaller value thereof indicates the green is stronger. The b* value represents degree of a change of color from blue to yellow, and a larger value thereof represents that the yellow is stronger, while the smaller value indicates that the blue is stronger).

Generally, in order to convert the RGB format data to the L*a*b* format data, an input side color conversion table is used, and in order to convert the L*a*b* format data to the CMYK format data, an output side color conversion table is used. Since the relationship between the RGB values and the color displayed on the monitor 271 depends on the type of the monitor 271. Therefore, the input side color conversion table is defined for each type of monitor. On the other hand, the relationship between the CMYK values and the printed result depends on the types of the inkjet printer 1 and the types of the inks. Therefore, the output side color conversion table is defined for each inkjet printer 1.

FIG. 6 shows transition of data when the print data is created. As shown in FIG. 6, the print data 340 is created from the input RGB data 310. Typically, the RGB data 310 is image data generated with graphic software or captured by a scanner or digital camera, and the color of each pixel is represented by the RGB format. By converting the RGB values of each pixel of the image to the L*a*b* values based on the input side color conversion table, the L*a*b* data 320 is created. Then, by converting the L*a*b* values of each pixel of the image to the CMYK values, the CMYK data 330 is created. Further, to the CMYK data 330, pseudo-gradation processing is applied in accordance with a well-known error diffusion method, the print data 340 is created. The RGB data 310 is stored in the input RGB data storing area 231, the converted L*a*b* data 320 is stored in the converted L*a*b* data storing area 231, the converted CMYK data 330 is stored in the converted CMYK data storing area 233 and the print data 340 is stored in the print data storing area 234.

According to the first embodiment, the print data 340 is created such that the color of the image on the object (fabric) after it is washed reflects the image displayed on the monitor 271 based on the input RGB data 310. Thus, according to the first embodiment, an output side color conversion table 420 is prepared taking the fact that the object is washed into account. When the converted CMYK data 330 is created, the output side color conversion table 420 is used. It should be noted that the color (hue) of the image on the fabric after it has been washed is different depending on the type of the fabric (e.g., cotton, rayon, etc.), and a washing condition including a washing method (e.g., water washing, dry cleaning).

According to the first embodiment, for a plurality of combinations of the type of the fabric and the washing conditions, a plurality of output side color conversion tables 420 are created, respectively. Then, in accordance with the instruction of the user, one of the plurality of output side color conversion tables 420 is selected, and based thereon, the converted CMYK data 330 is created. It should be noted that the input side color conversion table 410 is stored in the input side color conversion table storing area 253 of the HDD 250, and the output side color conversion tables 420 are stored in the output side color conversion table storing area 254.

Here, a process for creating the output side color conversion tables 420 will be described. Firstly, a well-know color patch, IT8 is printed on the object, and then wash the object. Thereafter, the printed color patch is measured using a calorimeter to obtain the L*a*b* values of respective color patches. With the above process, for each color patch, the CMYK value (output data) and the L*a*b* value (after washed) are obtained. Therefore, the output side color conversion table 420 which is a comparison table of the L*a*b* values and CMYK values can be obtained. It should be noted that, according to the first embodiment, it is not necessary to print and measure all the color patches corresponding to all the combinations of the CMYK values. Only a predetermined kinds of color patches are printed and measured to obtain the L*a*b* values therefor. When the output side color conversion table 420 is created, a well-know interpolation method is used (e.g., a volume interpolation is performed with sequentially changing the CMYK values as a parameter).

According to the first embodiment, four kinds of output side color conversion tables 420 for different combinations of types of the fabric and washing methods are prepared. Specifically, the output side color conversion tables 420 include: a first output side color conversion table 421 corresponding to a case where the cotton is water-washed; a second output side color conversion table 422 corresponding to a case where the cotton is dry-cleaned; a third output side color conversion table 423 corresponding to a case where the rayon is water-washed; and a fourth output side color conversion table 424 corresponding to a case where the rayon is dry-cleaned. FIGS. 7-10 show the first through fourth output side color conversion tables 421-424, respectively. Each of the L*a*b* values is indicated as L* value, a* value and b* value, and each of the CMYK values is indicated as C value, M value, Y value and K value. In this example, each of the RGB values is expressed as 256-step gradation values (i.e., 0-255), each of the CMYK values is also expressed as 256-step gradation values (i.e., 0 through 255), L* value is expressed as 101-step gradation value (i.e., 0 through 100), and each of a* value and b* value is expressed as 256-step gradation value (i.e., −128 through 127).

As indicated in FIG. 7, in the first output side color conversion table 421, the L*a*b* values (50, 0, 0) are converted into the CMYK values (138, 117, 117, 28), the L*a*b* values (50, 0, 10) are converted into the CMYK values (128, 112, 148, 36), the L*a*b* values (50, 0, 20) are converted into the CMYK values (120, 110, 179, 43), the L*a*b* values (50, 0, 30) are converted into the CMYK values (115, 110, 212, 46), and the L*a*b* values (50, 0, 40) are converted into the CMYK values (112, 110, 252, 46). For further values of the L*a*b* values and their converted values, indications thereof are omitted for the sake of brevity.

As indicated in FIG. 8, in the second output side color conversion table 422, the L*a*b* values (50, 0, 0) are converted into the CMYK values (132, 111, 110, 19), the L*a*b* values (50, 0, 10) are converted into the CMYK values (127, 105, 144, 30), the L*a*b* values (50, 0, 20) are converted into the CMYK values (118, 106, 178, 41), the L*a*b* values (50, 0, 30) are converted into the CMYK values (106, 102, 205, 44), and the L*a*b* values (50, 0, 40) are converted into the CMYK values (110, 105, 246, 40). For further values of the L*a*b* values and their converted values, indications thereof are omitted for the sake of brevity.

As indicated in FIG. 9, in the third output side color conversion table 423, the L*a*b* values (50, 0, 0) are converted into the CMYK values (58, 60, 44, 14), the L*a*b* values (50, 0, 10) are converted into the CMYK values (68, 101, 134, 16), the L*a*b* values (50, 0, 20) are converted into the CMYK values (68, 97, 132, 22), the L*a*b* values (50, 0, 30) are converted into the CMYK values (47, 45, 109, 19), and the L*a*b* values (50, 0, 40) are converted into the CMYK values (74, 45, 120, 29). For further values of the L*a*b* values and their converted values, indications thereof are omitted for the sake of brevity.

As indicated in FIG. 10, in the fourth output side color conversion table 424, the L*a*b* values (50, 0, 0) are converted into the CMYK values (51, 50, 36, 13), the L*a*b* values (50, 0, 10) are converted into the CMYK values (65, 97, 130, 9), the L*a*b* values (50, 0, 20) are converted into the CMYK values (67, 88, 128, 13), the L*a*b* values (50, 0, 30) are converted into the CMYK values (47, 35, 107, 19), and the L*a*b* values (50, 0, 40) are converted into the CMYK values (67, 43, 115, 27). For further values of the L*a*b* values and their converted values, indications thereof are omitted for the sake of brevity.

Next, with reference to FIG. 11, the input side color conversion table 410 will be described. FIG. 11 shows the data structure of the input side color conversion table 410. The input side color conversion table 410 stores the RGB values and the converted L*a*b* values. In the following description, the R value, G value and B value are indicated as (R value, G value, B value). In the example shown in FIG. 11, RGB values (119, 119, 119) are converted into L*a*b* values (50, 0, 0), RGB values (125, 119, 102) are converted into L*a*b* values (50, 0, 10), RGB values (129, 119, 85) are converted into L*a*b* values (50, 0, 20), RGB values (132, 118, 67) are converted into L*a*b* values (50, 0, 30), and RGB values (135, 118, 48) are converted into L*a*b* values (50, 0, 40). For further values of the RGB values and their converted values (L*a*b* values), indications thereof are omitted for the sake of brevity.

Next, the input RGB data 310, the converted L*a*b* data 320 and converted CMYK data 330 will be described. FIG. 13 shows a data structure 321 of L*a*b* data, which has been converted from the input RGB data shown in FIG. 12 using the input side color conversion data 421. FIG. 14 shows a data structure of CMYK data 331, which has been converted from the L*a*b* data 321 using the first output side color conversion table 421. FIG. 15 shows a data structure of CMYK data 332, which has been converted from the L*a*b* data 321 using the second output side color conversion table 422. FIG. 16 shows a data structure of CMYK data 333, which has been converted from the L*a*b* data 321 using the third output side color conversion table 423. FIG. 17 shows a data structure of CMYK data 334, which has been converted from the L*a*b* data 324 using the fourth output side color conversion table 424.

As indicated in FIG. 12, the RGB values of the RGB data 310, which is exemplary data of the input RGB data 310, for the first-seventh pixels are (129, 119, 85), (128, 0, 0), (0, 128, 0), (0, 0, 128), (0, 150, 150), (200, 200, 0) and (70, 70, 70), respectively. The RGB values of eighth pixel onward are omitted for the brevity. As indicated in FIG. 13, the L*a*b* values of the L*a*b* data 321, which is exemplary data of the converted L*a*b* data converted using the input side color conversion table 411, for the first-seventh pixels are (50, 0, 20), (26, 48, 39), (48, −48, 49), (11, 41, −67), (56, −34, −10), (79, −13, 78) and (30, 0, 0), respectively. The L*a*b* values of eighth pixel onward are omitted for the brevity.

As indicated in FIG. 14, in the converted CMYK data 331 which is created using the first output side color conversion table 421, the CMYK values for the first-seventh pixels are (120, 110, 179, 43), (76, 255, 255, 107), (242, 33, 255, 28), (255, 249, 61, 66), (226, 68, 132, 20), (86, 43, 255, 5) and (130, 160, 153, 114), respectively. The CMYK values of eighth pixel onward are omitted for the brevity.

As indicated in FIG. 15, in the converted CMYK data 332 which is created using the second output side color conversion table 422, the CMYK values for the first-seventh pixels are (118, 106, 178, 41), (73, 255, 249, 102), (219, 25, 255, 17), (255, 242, 51, 53), (219, 61, 127, 12), (76, 38, 255, 0) and (127, 153, 147, 107), respectively. The CMYK values of eighth pixel onward are omitted for the brevity.

As indicated in FIG. 16, in the converted CMYK data 333 which is created using the third output side color conversion table 423, the CMYK values for the first-seventh pixels are (68, 97, 132, 22), (27, 93, 70, 44), (61, 13, 105, 11), (75, 84, 23, 21), (104, 22, 39, 6), (22, 14, 78, 1) and (52, 40, 43, 31), respectively. The CMYK values of eighth pixel onward are omitted for the brevity.

As indicated in FIG. 17, in the converted CMYK data 334 which is created using the fourth output side color conversion table 424, the CMYK values for the first-seventh pixels are (67, 88, 128, 13), (26, 88, 66, 39), (57, 10, 104, 6), (72, 83, 20, 17), (103, 20, 37, 1), (19, 9, 76, 0) and (50, 36, 42, 29), respectively. The CMYK values of eighth pixel onward are omitted for the brevity.

Next, the print data creating procedure executed in the PC 200 will be described in detail with reference to a flowchart. The print data creating procedure is executed when the washing condition is designated in the print start dialogue 500 (FIG. 18), and the printing is instructed. FIG. 18 shows a screen image of the print start dialogue. FIG. 19 is a flowchart illustrating the print data creating procedure, and FIG. 20 is a flowchart illustrating an output side color conversion table determining procedure which is called in the print data creating procedure shown in FIG. 20.

As shown in FIG. 18, in the print start dialogue 500, a message "Print is started. OK? Please select a washing condition" is indicated together with a washing condition selecting column, an OK button and a Cancel button. In the washing condition selecting column, the user can select a type of the fabric and a washing method using radio buttons. In this example, the type of the fabric can be selected from "cotton" and "rayon". The washing method can be selected from "water washing" and "dry cleaning". When the user selects (clicks) the OK button, the print data creating procedure is started. When the cancel button is selected, the print data creating procedure will not be executed. If the user selects the OK button before selecting the washing condition (i.e., the type of the fabric and washing method), a dialogue 500 indicating a message "Please select a washing condition" is displayed to request the user to make a selection.

When the print data creating procedure is started, firstly, control executes the output side color conversion table determining procedure (S1) in which the output side color conversion table 420 corresponding to the designated washing condition is determined. As illustrated in FIG. 20, if the "cotton" is selected as the type of the fabric (S11: YES), and "water washing" is selected as the washing method (S12: YES) in the print start dialogue 500 (FIG. 18), the first input side color conversion table 421 is selected (S13). If the "cotton" is selected as the type of the fabric (S11: YES), and "dry cleaning" is selected as the washing method (S12: NO), the second input side color conversion table 422 is selected (S14). If the "rayon" is selected as the type of the fabric (S11: NO), and "water washing" is selected as the washing method (S15: YES), the third input side color conversion table 423 is selected (S16). If the "rayon" is selected as the type of the fabric (S11: NO), and "dry cleaning" is selected as the washing method (S15: NO), the fourth input side color conversion table 424 is selected (S17). 0141 After the output side color conversion table 420 is determined as above (S1), the image data to be printed is stored in the input RGB data storing area 231 (S2). Then, in S3, process retrieves the RGB values of the first pixel of the stored image (S3). In the example of the RGB data 310 shown in FIG. 12, firstly the RGB values (129, 119, 85) for the pixel number one (1) are retrieved. Then, corresponding to the retrieved RGB values, the L*a*b* values stored in the input side color conversion table 410 are obtained. Using the input side color conversion table 410 as obtained, the RGB values are converted into the L*a*b* values. The converted L*a* b* values are stored in the converted L*a*b* data storing area 232 at a column for the corresponding pixel (S4). Next, in the output side color conversion table 420 selected in S1, the CMYK values which are stored corresponding to the converted L*a*b* values are obtained, thereby the L*a*b* values being converted into the CMYK values. Then, the converted CMYK values are stored in the converted CMYK data storing area 233 at a column for the corresponding pixel (S5). For example, with reference to the input side color conversion table 411 shown in FIG. 11, the RGB values (129, 119, 85) are converted to the L*a*b* values (50, 0, 20). Then, if "cotton, water washing" are selected as the washing condition, the first output side color conversion table 421 (FIG. 7) is referred to in S1 and the L*a*b* values are converted to the CMYK values (120, 110, 179, 43).

In S6, process judges whether the conversion is done for all the pixels. At the initial stage, only one pixel has been processed and all the remaining pixels have not been processed (i.e., the conversion has not yet been performed) (S6: NO). Then, process returns to S3, and the RGB values for the next pixel are retrieved (S3). Next, the L*a*b* values corresponding to the RGB values are obtained from the input side color conversion table 410, and the RGB values are converted into the L*a*b* values (S4). Further, from the output side color conversion table 420 selected in S1, the CMYK values corresponding to the converted L*a*b* values are obtained, thereby the L*a*b* values are converted into the CMYK values (S5). Until all the pixels are processed (S6: NO), process returns to S3. In the example of the input RGB data 310 shown in FIG. 12, the RGB values (128, 0, 0) are converted into L*a*b* values (26, 48, 39) (see FIG. 13) in S4, then converted into CMYK values (76, 255, 255, 107) (see FIG. 14) in S5.

Steps S3-S6 are repeated and the conversion has been carried out for all the pixels (S6: YES), the pseudo-gradation processing in accordance with the error-diffusion method or dither matrix method, thereby the print data is created (S7). In S8, the thus created print data is transmitted to the inkjet printer 1 and the procedure shown in FIG. 19 is finished.

As described above, the RGB format color expression is converted into the L*a*b* format color expression, and further, based on the output side color conversion table 420 selected in accordance with the selecting condition, the L*a*b* format color expression is converted into the CMYK format color expression and then the print data is created. The thus created print data is transmitted to the inkjet printer 1 and the printing operation is carried out. The object will be washed after the image is printed by the inkjet printer 1. However, the printing is carried out in accordance with the print data created from the CMYK values, which are determined using the output side color conversion table 420 defined based on the color (hue) on the object after it is washed. Therefore, the color of the image on the object after it is washed is the same as the color of the image displayed on the monitor 271 of the PC 200.

It should be noted that the invention is not limited to the above-described exemplary embodiment, and various modification can be made. Some examples of such modifications will be described below.

In the first embodiment, as examples of the types of fabric, only the "cotton" and the "rayon" are indicated. The type of the fabric need not be limited to the two types, and it is modified such that the user can select optionally or alternatively other types of fabric as well. The other types of fabric may include "silk", "wool", "cuprammonium rayon" and various types of blended yarn fabric and chemical fiber fabric. Further, in the first embodiment, as the examples of the washing methods, the "water washing" and the "dry cleaning" are indicated. However, the washing method need not be limited to the two method. Examples of other washing methods may include "water washing using detergent", "washing with ironing", "washing twice", "washing thrice". Further, it may be modified such that whether the detergent is used, and if used, the type thereof may be made selectable. It may further be modified such that the selectable washing method may include whether the ironing is to be done and the number of times of washing. The washing method may further include a drying method, which may include "natural drying", "drying in shade" and "dryer". It should be noted that the additional conditions, i.e., the types of fabrics and washing methods are introduced, additional output side color conversion tables 420 should be prepared. It is possible that an output side color conversion table 420 corresponding to a case where the printed fabric will not be washed (which is similar to a conventional table for a case where washing is not taken into account), and the print start dialogue may be configured such that "no washing" can also be selected.

According to the first embodiment, in order to designate the type of the fabric and the washing method, radio buttons displayed in the print start dialogue 500 are used. This can be modified such that any other suitable selecting method can be used. Such a method may employ a list box, combo box or check boxes. Alternatively or optionally, a text box may be used to allow the user to directly input a text string indicative of a selection.

In the first embodiment, the user selects the type of fabric and the washing method separately. However, if the washing method depends on the type of fabric, the procedure may be modified such that the washing method is automatically determined when the user designates the type of the fabric. An example of such a procedure is illustrated in FIG. 21.

FIG. 21 is a flowchart illustrating an input accepting procedure in which the washing method is automatically determined depending on the designated fabric. The flowchart shown in FIG. 21 is executed when the print start dialogue 500 is displayed on the monitor 271.

When the user selects the radio button of the "rayon" in the print start dialogue 500 with the mouse or the keyboard (S51: YES), as the type of the fabric, "rayon" is selected (S61). Specifically, the displayed status of the radio button for the "rayon" is changed to indicate that it is selected, and data indicative of "rayon" is stored in the fabric type storing area of the information storing area 235. Next, as the washing method, "dry cleaning" is automatically designated (S62). Specifically, the displayed status of the radio button for the "dry cleaning" is changed to indicate that it is selected, while the radio button for the "water wash" is disabled to select. Then, data indicative of "dry cleaning" is stored in the information storing area 235. Thereafter, process returns to S51.

If no operations are made by the user, process waits for a further input by the user (S51-S56: NO). If the OK button is selected (S51-S55: NO; S56: YES), since the washing condition has been designated (S62: YES), control finished the input accepting procedure shown in FIG. 18. Then, the print data creating procedure shown in FIG. 19 is started. If the cancel button is selected (S51-S54: NO; S55: YES), the washing condition stored in the fabric type storing area of the information storing area 235 is cleared (S67), and the procedure shown in FIG. 18 is finished.

When the user selects the radio button of the "cotton" in the print start dialogue 500 with the mouse or the keyboard (S51: NO), as the type of the fabric, "cotton" is selected (S63). Specifically, the displayed status of the radio button for the "cotton" is changed to indicate that it is selected, and data indicative of "cotton" is stored in the information storing area 235. If the "rayon" has been selected and the "dry cleaning" has been designated (i.e., the radio button for the "water washing" cannot be selected), the disabled status of the radio button for "water washing" is released (i.e., the user can select the "water washing" button.

If the "water washing" is designated (S51: NO; S52: NO; S53: YES), control determines the "water washing" as the washing method (S65). Specifically, the displayed status of the radio button for the "water washing" is changed to indicate that it is selected, and data indicative of the "water washing" is stored in the washing method storing area in the information storing area 235. If the "dry cleaning" is designated (S51: NO; S52: NO; S53: NO; S54: YES), control determines the "dry cleaning" as the washing method (S66), in a similar manner. Then, control returns to S51.

If the "OK" button is designated (S51-S55: NO; S56: YES), since the washing condition has been made (S68: YES), the procedure shown in FIG. 18 is finished, and the print data creating procedure shown in FIG. 19 is started.

If the "OK" button has been selected before neither the type of the fabric nor the washing method has been designated (S56: YES; S68: NO), messages such as "Please designate the washing method" (S69). Thereafter, control returns to S51, and acquisition of designation of the type of the fabric and the washing method is continued.

If the type of the fabric is one, or if there is not significant difference between a plurality of types of fabrics in terms of the color (hue) of the image after washed when the washing method is the same, the procedure described above may be modified such that only the washing method is designated.

FIG. 22 is a screen image of a print start dialogue 600 for such a modification. In this example, the fabric is "cotton" and only the washing method is designated by the user through the print start dialogue 600. As shown in FIG. 22, the print start dialogue 600 having a message "Printing is carried out. OK? Please select a washing method." is displayed, which requires the user to designate the washing condition.

In the above modification, the PC 200 retains only the first output side color conversion table 421 (see FIG. 7) and the second output side color conversion table 422 (see FIG. 8) as the output side color conversion tables. In the print data creating procedure (see FIG. 19), when the "water washing" is designated as the washing method, the first output side color conversion table 421 is selected in S1, while, if the "dry cleaning" is designated, the second output side color conversion table 422 is selected in S1.

In the first embodiment, the print data is created in the PC 200, and then transmitted to the inkjet printer 1. However, the invention need not be limited to such a configuration, and the print data may be created in the inkjet printer 1. Such an configuration will be described hereinafter as a modification of the first embodiment.

When the inkjet printer is configure to create the print data, a condition setting dialogue 700 as shown in FIG. 23 may be displayed on the display 175 of the inkjet printer 1.

For example, by operating the menu button 184, left arrow button 185, right arrow button 186 and enter button 187 of the operation panel 28 of the inkjet printer 1, the condition setting window is displayed on the display 175. As shown in FIG. 23, in the dialogue 700, a message "Please select a fabric type.", "cotton" button, "rayon" button", "OK" button and "cancel" button are displayed. For example, if the "cotton" button is selected using the left arrow button 185, right arrow button 186 and enter button 187, and then the enter button 187 is depressed, it becomes possible to select the "OK" button or "cancel" button. When, for example, the enter button 187 is depressed with the "OK" button being selected, the "cotton" is input as the fabric type.

Next, another dialogue for selecting the washing method may be displayed (not shown). In the dialogue for selecting the washing method, similarly to the above, "water washing" button, "dry cleaning" button, "OK" button and "cancel" button may be displayed, and the user can select and input the washing method by operating the operation panel 28.

After the washing condition (i.e., fabric type and washing method) is designated, a confirmation window (not shown) provided with an "OK" button and "cancel" button is preferably displayed on the display 175 so that the user can finally determine to proceed with the set condition. When the "OK" button is selected and the enter button 187 is depressed, the inkjet printer 1 operates in accordance with the thus set washing condition.

When the inkjet printer 1 is ready as described above, the RGB data 310 is transmitted form the PC 200 to the inkjet printer 1. It should be noted that, since the print data is created in the inkjet printer 1, the input side and output side color conversion tables 410 and 420 are stored in the ROM 120 of the inkjet printer 1. The print data creating procedure executed by the CPU 110 of the inkjet printer 1 is similar to the procedure shown in FIG. 19, except that S8 is changed to "printing operation".

It should be noted that, when the print data is created in the inkjet printer 1, the PC 200 may create the L*a*b* data and output the same to the inkjet printer 1. That is, the PC 200 converts the RGB data 310 to the L*a*b* data 320 using the input side color conversion table 410 (cf. steps S2, S3, S4 and S6 of FIG. 19), and transmits the converted L*a*b* data to the inkjet printer 1. In this case, the inkjet printer 1 has the output side color conversion table 420 (e.g., in the ROM 120), and converts the received L*a*b* data 320 to the CMYK data 330. Specifically, the CPU 110 retrieves L*a*b* values for one pixel from the received L*a*b* data 320 and converts the retrieved data to the CMYK values using the output side color conversion table 420. By repeating the above conversion for all the pixels so that the L*a*b* data is converted into the CMYK data, the print data is created by applying the pseudo-gradation process. Then, the inkjet printer 1 carries out the printing procedure in accordance with the thus created print data.

Second Embodiment

Hereinafter, a printing system, which includes a personal computer 1200 and an inkjet printer 1100, according to second through fifth embodiments will be described. According to the second through fifth embodiment, images can be printed in accordance with the printing environment such as the temperature and humidity.

In the second embodiment, the PC 1200 creates a plurality of pieces of print data, and the inkjet printer 1100 selects an appropriate one of the plurality of pieces of print data in accordance with the printing environment, and prints images in accordance with the selected one of the plurality of pieces of print data.

In the third embodiment, the PC 1200 transmits image data, and the inkjet printer 1100 receives the image data, creates a plurality of pieces of print data, and selects one of the plurality of pieces of print data in accordance with the printing environment.

A hardware configuration of the inkjet printer 1100 is the same as that of the first embodiment, which is shown in FIG. 1. Therefore, the structure of the inkjet printer 1100 will not be described.

FIG. 24 is a block diagram illustrating a configuration of the PC 1200. As shown in FIG. 24, the PC 1200 includes a CPU 1210, a ROM 1220, a RAM 1230, a CD-ROM drive 1240, an HDD 1250, a USB interface 1260, a display control unit 1270 that control a monitor 1271, an input detection unit 1280 that detects operation of a keyboard 1281 and a mouse 1282. The CD-ROM drive 1240 readouts data stored in a CD-ROM 1241 which is inserted in the CD-ROM drive 1240. The PC 1200 is connected with the inkjet printer 1100 via the USB interface 1260.

Since the components (1210-1280) indicated above have substantially the same as the components 210-282 of the first embodiment shown in FIG. 3. Therefore, the components shown in FIG. 24 will not be described in detail here.

It should be noted that the CD-ROM 1241 stores a print data program, which will be described later, and settings and data for the print data creating program. When the program is firstly installed in the PC 1200, the program and data are retrieved from the CD-ROM 1241 and stored in a program storing area 1252 and data storing area 1253 (see FIG. 26).

According to the second embodiment, the RAM 1230 stores an input side color conversion table which is used when a color space of the image data is converted, and output side color conversion tables used for converting the color space that is converted using the input side color conversion table to a color space of the inkjet printer 1100. The color conversion tables will be described in detail later.

It should be noted that, according to the second embodiment, the PC 1200 creates a plurality of pieces of print data, which are transmitted to the inkjet printer 1100. According the third embodiment, the PC 1200 transmits image data to the inkjet printer 1100, which creates a plurality of pieces of print data and executes a printing operation selecting appropriate data from the plurality of pieces of print data.

Specifically, in the PC 1200, a print data creating program (see FIG. 30), which is one of a module of a driver program for creating the print data from the image data, is executed according to the second embodiment. In this case, in the inkjet printer 1100, a print executing program (see FIG. 31), which is a module of a diver program for carrying out the printing operation, is executed.

According to the third embodiment, in the inkjet printer 1100, the print data creating program is executed as one of the program modules which are executed when the print data is created from the image data and then the printing operation is executed.

FIG. 25 schematically shows a configuration of the RAM 1230 of the PC 1200 shown in FIG. 24. The RAM 1230 has a work area 1231 for temporarily storing data when the CPU 1210 is executing a program, an input image data storing area 1232 for temporarily storing input image data, and an output data storing area 1233 for storing (in the second embodiment) a plurality of pieces of print data created by the print data creating program. Although not indicated, the RAM 1230 includes further storing areas for various data.

FIG. 26 schematically shows a configuration of the HDD 1250 of the PC 1200 shown in FIG. 24. The HDD 1250 has an OS (operating system) storing area 1251 for storing programs for controlling the operation of the PC 1200 (which are executed by the CPU 1210), a program storing areas 1252 for storing various programs including the print data creating program to be executed in the PC 1200, a data storing area 1253 fro storing initial values and data necessary for respective programs executed by the CPU 1210. The HDD 1250 further includes a print queue 154 that temporarily stores (a) print data created from the image data stored in the output data storing area 1233 (in the second embodiment) or (b) image data created by applications or the like (in the second embodiment). Although not indicated in FIG. 26, the HDD 1250 includes further storing areas for various data.

FIG. 27 is a block diagram showing a configuration of the inkjet printer 1100.

As shown in FIG. 27, the inkjet printer 1100 includes a CPU 1110 that controls the entire operation of the inkjet printer 1100. Via a bus 1115, the CPU 1110 is connected with a ROM 1120 storing control programs to be executed by the CPU 1110, and a RAM 1130 temporarily storing various data.

Further, the CPU 1110 is connected, via the bus 1115, a head driving unit 1140, a motor driving unit 1150 and a USB (Universal Serial Bus) interface 1160. The head driving unit drives piezoelectric actuators (not shown) respectively provided to the ejection channels of the inkjet heads 21. The motor driving unit 1150 drives the carriage motor 1151 that drives the carriage 20 (see FIG. 1) mounting the inkjet heads 21 (see FIG. 1), and the platen driving motor 7 that drives a platen roller (not shown), which controls the speed and timing for driving the platen 5 (see FIG. 1) that holds the object (e.g., fabric such as the T-shirt). The motor driving unit 1150 also controls a feed motor 1153 that drives a feed roller (not shown) for feeding the object (e.g., T-shirt). The USB interface 1160 enables the inkjet printer 1100 to perform a data communication with external devices including the personal computer 1200, which are connected to the inkjet printer 1100 through a USB cable (not shown).

Further, a display control unit 1170 for controlling the display 175 (see FIG. 1) is connected with the CPU 1110 through the bus 1115. In the second embodiment, a temperature sensor 1181 for measuring the temperature of the inkjet printer 1100 and a humidity sensor 1181 for measuring the humidity of the inkjet printer 1100 are connected with the input detection unit 1183 as well as the operation panel 28 (see FIG. 1). The input detection unit 1183 is connected with the CPU 1110 through the bus 1115.

The temperature sensor 1181 and the humidity sensor 1182 may be located anywhere inside the inkjet printer 1100 if they can measure the temperature and humidity effectively. Preferably, the temperature sensor 1181 and the humidity sensor 1182 are located in the vicinity of the inkjet heads 21 or in the vicinity of the object (e.g., T-shirt) on which the image is formed.

In the second embodiment, the setting information which is input through the operation panel 28 by the user includes the type of the object (e.g., paper or fabric), resolution represented by the print data, and print method (e.g., monochromatic or color). Optionally or alternatively, other information may be input as information related to the printing condition. The operation panel 28 is provided with a print start button for instructing the inkjet printer 1100 to start printing operation.

As shown in FIG. 28, the ROM 1120 has a program storing area 1121 and an information storing area 1122. The program storing area 1121 stores control programs for controlling operations of the inkjet printer 1100 (and, in the third embodiment, a print execution program for executing the printing operation and the print data creating program (see FIG. 30). The information storing area 1122 stores settings and initial values necessary to execute respective programs and data therefor.

As shown in FIG. 29, the RAM 130 has a work area 1131 and a receiving buffer 1132 (and, in the third embodiment, a print image data storing area 1133. The work area 1131 temporarily stores data during execution of programs. The receiving buffer 1132 stores a plurality of pieces of print data as received (in second embodiment) or the image data as received (in the third embodiment).

Next, the print data creating operation of the PC 1200 will be described with reference to FIGS. 30 through 39. FIG. 30 is a flowchart illustrating a procedure of the print data creating program. FIG. 31 shows a correspondence between the printing environment and the output side color conversion table. FIGS. 32, 33, 34 and 35 show an example of C (cyan), M (magenta), Y (yellow) and K (black) components of the print data, respectively.

FIGS. 36, 37, 38 and 39 show another example of C, M, Y and K components of the print data, respectively.

In the applications executed in the PC 1200, image data is created to have the RGB format. When the user inputs the instruction to print out the image, the application or the OS calls the print data creating program, which will be described in detail, referring to FIG. 30.

When the image data to be printed is input, it is stored in the input image data storing area 1132. When a input side color conversion table is input, it is stored in the RAM 1130 (S111). If the input side color conversion table has already been stored in the RAM 1130, it is unnecessary to store the same again in S111. The image data can be data which has already been stored in the PC 1200 or data retrieved from an external storage.

The input side color conversion table stored in the RAM 1130 is a profile for converting the color space of the RGB format image data into the color space of the L*a*b* format data, and is configured as a LUT (look up table) realizing the color conversion between different devices. Using this input side color conversion table, the RGB format image data stored in the input image data storing area 1132 is stored into L*a*b* format data.

By using the L*a*b* format representation, not only for adjusting the color among different monitors, but any image data, for example, captured with an image scanner or image data to be printed by a printer, it is possible for the user to recognize the color regardless of color representation characteristic of various devices. The profile of each device is, typically, provided by the manufacturer of each device.

If the input side color conversion table is not stored in the RAM 1130, the conversion of the color space is executed using an sRGB (standard RGB). The sRGB is a color space of international standard which defines and integrates the color and chromaticness etc. in order to absorb differences of color reproduction of an image among devices. For example, in most of the PC peripherals such as digital cameras, printers and monitors, by carrying out the color adjustment based on the sRGB standard, the color difference between the image displayed on a monitor and the image printed by a printed is made as small as possible. Therefore, according to the second embodiment, where there is no input side color conversion table in the RAM 1130, the color conversion of the image data is carried out in accordance with the sRGB standard.

Next, the output side color conversion table corresponding to one combination of printing condition and environment condition is selected from the output side color conversion tables stored in the RAM 1130 (S112). It should be noted that a plurality of output side color conversion tables have been prepared corresponding to various combinations of printing conditions and environment conditions, and are stored in the RAM 1130. In S112, the plurality of output side color conversion tables one by one in a predetermined order.

The output side color conversion tables stored in the RAM 1130 are profiles for converting the color space of the L*a*b* format data to the color space of the CMYK format data in accordance with printing environment which is defined by a combination of a printing condition and an environment condition. The output side color conversion tables are also configured as LUTs (look up tables) realizing the color conversion among different devices.

In the subsequent procedure, using the output side color conversion tables, the color space of the L*a*b* format data which is stored in the input image data storing area 1132 is converted into the color space of the CMYK format.

The process of converting the color space of the L*a*b* format data to the color space of the CMYK format data is executed with referring to the output side color conversion table, which is the profile based on the characteristics of the inkjet printer 1100. The output side color conversion tables are typically proved by the manufacturers of the inkjet printers, as described above.

For example, the output side color conversion table is created as follows. Firstly, to all the combinations of the available CMYK values, a binarizing process (i.e., half-tone process) is applied, and printing is carried out. Then, by measuring the printed results using a calorimeter, the L*a*b* values are obtained. Based on this experimental results, tables defining the relationship between the L*a*b* values and CMYK values are created, which are defined as the profiles corresponding to the printing environment based on the characteristics of the inkjet printer 1100. It should be noted that, the number of all the combinations of the CMYK values becomes very large. Therefore, practically, the above measurement is performed only for a predetermined number of combinations, and for the other combinations, interpolation may be made. The plurality of color conversion tables thus created corresponding to a plurality of predetermined printing environments are stored in the RAM 1130.

As mentioned before, the CMYK format data expressed a color of each pixel with three primary colors of C (cyan), M (magenta) and Y (yellow), and further with K (black). Each color component is indicated by the density value ranging from 0-255. Generally, in inkjet printers, if a relatively large density value is assigned to a pixel, with a process according to a well-known error-diffusion method, a probability that ink drops are ejected to and in the vicinity of the pixel becomes higher.

Here, the printing environment defined by a combination of the printing condition and the environment condition will be described in detail. Depending on the printing environment when the printing operation is carried out, the result (i.e., the printed image) is different. As briefly mentioned above, the printing environment includes one or more factors that have effects on the print result. The factors can be divided into the print conditions and the environment conditions.

The printing conditions are conditions represent settings when the printing operation is executed, which are arbitrarily set by the user. The printing conditions include, for example, the type of the object, resolution of printing and printing method. The type of the object is data indicating the material of the object, such as a normal paper sheet or fabric. The printing resolution is information indicating a print quality by the number of pixels (dots) per a unit area. The type of print method represents a method such as color printing or monochromatic printing.

The environment conditions represent ambient conditions of the inkjet printer 1100. The environment conditions may include the temperature and humidity, when the printing is actually performed, which may change at every execution of the printing operation.

As above, there are a plurality of factors defining the printing environment. It should be appreciated that whichever factors should be referred to is completely left to the user's and/or designer's discretion. For example, the more the factors are referred to, the more the accuracy of printed image is. However, if the number of the factors increases, the amount of data processing also increases. Therefore, according to the second embodiment, only representative factors, i.e., the print resolution, the temperature and the humidity are referred to in the following description.

Further, as aforementioned, the printing environment is defined by a combination of a plurality of factors, which are divided into print conditions or environment condition. Each factor is changeable, and thus a combination of the factors includes combinations of different values of respective factors. According to the second embodiments, using some representative values for each factor, a plurality of conditions are defined. For example, the condition of the "temperature" includes six (6) patterns: each 10° C. within a range from 0° C. to 50° C. (0° C., 10° C., 20° C., 30° C., 40° C. and 50° C.), the condition of the "humidity" includes five (5) patterns: each 20% within a range from 20% to 100% (20%, 40%, 60%, 80% and 100%), and the condition of the "print resolution" includes three (3) patterns: 300dpi, 600dpi and 1200dpi. By combining the above patters, ninety (90) combinations are defined.

As shown in FIG. 31, corresponding to the combinations of the factors, ninety (90) patterns, first to ninety output side color conversion tables are prepared and stored in the RAM 1130. In S112 of the print data creation procedure, the output side color conversion tables as described above are referred to one by one.

In steps S113-S116, for all the pixels constituting the image data, a processing is applied to subsequently. Firstly, in S113, one of the pixels of the image data is selected (i.e., notice pixel is determined). The data of the notice pixel is RGB format data, which is converted, with reference to the input side color conversion table, to the L*a*b* format data which is independent from the device. Then, the L*a*b* format data is converted, with reference to the output side color conversion table, to the CMYK format data. It should be noted that various method have conventionally been known to convert the RGB format data to the CMYK format data via the L*a*b* format data, and any method can be employed in the above procedure.

Specifically, the data of the notice pixel is retrieved into the work area 1131, and based on the input side color conversion table stored in the RAM 1130, the notice pixel data is converted from the RGB format to the L*a*b* format (S114). As aforementioned, according to the second embodiment, the input side color conversion data has not been input in S111. Accordingly, for the conversion, sRGB is used. Alternatively, when the input side color conversion table is not available, conversion may be made based on general values which are calculated based on known calculations.

The data converted into the L*a*b* format data in S114 is further converted into the CMYK format data referring to the output side color conversion table selected in S112 (S115). For example, when the printing condition is: temperature 20° C.; humidity 20%; and print resolution 300 dpi, and the color conversion table T1 in FIG. 31 has been selected in S112, the L*a*b* format data is converted to the CMYK format data based on the color conversion table T1.

In S116, process judges whether steps S113-SI15 have been executed for all the pixels. If there is one or more pixels which has not been processed (S1 16: NO), process returns to S113 and above-described steps are repeated. If all the pixels have been processed (S116: YES), process proceeds to S117. In S117, for all the pixels, the pseudo-gradation process is applied to the CMYK format data, thereby print data used by the inkjet printer 1100 is created. The pseudo-gradation process is a process for adjusting the CMYK format data to print gradation, and description will be made assuming that a well-known error-diffusion method is employed.

As above, the print data is created based on the image data. The conversion of the color space in steps S114, S115 and S117 will be further described referring to an exemplary case where the image data consists of 5×5 pixels, and all the pixel has the same color whose RGB values are (200, 0, 0). In this example, it is assumed that the inkjet printer 1100 is controlled "to print a dot" or "not to print a dot" for each pixel (i.e., two-step), and the object is a normal paper.

When the each pixel data is converted into the L*a*b* format data based on the sRGB (S114), the RGB values are converted to the L*a*b* values (43, 67, 58). If the selected output side color conversion table is for the print environment condition: temperature 20° C.; humidity 20%; and print resolution 300 dpi, and the corresponding output color conversion has been selected (S112), each pixel having the L*a*b* values (43, 67, 58) is converted, based on the selected color conversion table, into the CMYK values (0, 200, 150, 0) in S115. For each pixel data having the CMYK values (0, 200, 150, 0) is processed in accordance with the error-diffusion method (i.e., the pseudo-gradation process is applied), the print data as shown in FIGS. 32-35 is created (S117).

The print data represents, for each of the C. value, M value, Y value and K value of each pixel, whether ink drops are to be ejected at positions within a print area in which the image is to be formed is determined. FIG. 32 is data for C. (cyan) component, FIG. 33 is data for M (magenta) component, FIG. 34 is data for Y (yellow) component, and FIG. 35 is data for K (black) component. In each of FIGS. 32-35, "0" indicates "to print a dot" and "1" indicates "not to print a dot".

If, in S112, the output side color conversion table corresponding to the printing condition: temperature 30° C.; humidity 60%; and print resolution 600 dpi is selected in S112, the L*a*b* values (43, 67, 58) are converted into the CMYK values (0, 120, 70, 0) in S115. To each pixel, which has the CMYK values (0, 120, 70, 0), the pseudo-gradation process according to the error-diffusion method is applied, the print data as shown in FIGS. 36-39 is created (S117). FIG. 36 is data for C. (cyan) component, FIG. 37 is data for M (magenta) component, FIG. 38 is data for Y (yellow) component, and FIG. 39 is data for K (black) component. In each of FIGS. 36-39, "0" indicates "to print a dot" and "1" indicates "not to print a dot".

It should be noted that the L*a*b* values calculated in S114 are only exemplary values, and the values will be different depending on the input side color conversion table and/or employed conversion method. Importantly, the values suitable for conversion using the output side color conversion tables in S115 should be calculated in S114. Similarly, the CMYK values calculated in S115 are exemplary values, and values will be different depending on the output side color conversion tables and/or employed conversion method. Importantly, the values suitable for conversion to the print data in S117 should be calculated in S115.

As above, based on the color conversion table selected in S112, print data corresponding to a certain print environment is created. In S118, process judges whether steps S112-S117 have been executed for all the combinations of the print conditions and the environment conditions. If there remains a combination which has not be processed (S118: NO), process returns to S112, where the next color conversion table is selected and the above steps are repeated.

When steps S112-S117 have been executed for all the combination of the print conditions and environment conditions (S118: YES), the print data corresponding to all the combinations have been created. In S119, the thus created print data is once stored in the print queue 1254 of the HDD 1250 as a group of print data, which will be transmitted to the inkjet printer 1100 via the USB interface 1260 (S119). Thereafter, the print data creating program is finished, i.e., the print data creating procedure is finished.

In each piece of the print data of the print data group which is grouped in S119, a combination of the printing condition and the environment condition (i.e., the printing environment) are indicated so that the correspondence with the print data and the print environment can be determined in the inkjet printer 1100 based on the print data.

It should be noted that the configuration of the print data need not be limited to the configuration described above. Any other manner would be used if the correspondence between the print data and the print environment is determined from the print data. Further, in the above example, since the plurality of pieces of print data are created from the same image data, and in view of convenience in handling the data, the plurality of pieces of print data are grouped to define a group of print data, which is transmitted to the inkjet printer 1100 at a time. This may be changed such that the plurality of pieces of print data are transmitted to the inkjet printer 1100 individually.

Next, the operation of the inkjet printer 1100 according to the second embodiment will be described with reference to FIGS. 40 and 41. FIG. 40 shows an example of a print data group, and FIG. 41 is a flowchart illustrating a printing procedure according to a second embodiment.

As described above, in the print data creating procedure shown in FIG. 30, the CPU 1210 of the PC 1200 creates a group of print data including a plurality of pieces of print data corresponding to all the combinations of the print conditions and environment conditions and transmits the print data group to the inkjet printer 1100 in S119. Then, the inkjet printer 1100 receives the print data group via data receiving buffer 1232, and stores the received print data group in the print data storing area 1233 of the RAM 1230.

As shown in FIG. 40, the print data group stored in the print data storing area 1233 consists of a plurality of pieces of print data 10 (10*a*, 10*b*, 10*c*. . . ). Each piece of print data (e.g., print data 10*a*) has a header part 11 indicating the print environment (i.e., a combination of the print condition and environment condition), and print data parts 12, 13, 14 and 15 respectively having print data of C. component, print data of M component, print data of Y component and print data of K component.

As described above, the print data 10 (10*a*, 10*b*, . . . ) is created from the image data, based on the output side color conversion table, an example of which is shown in FIG. 31. In the second embodiment, there are 90 output side color conversion tables. Therefore, the print data group consists of 90 pieces of print data (10*a*, 10*b*, . . . ). Further, each print data 10*a* (10*b*, 10*c*, . . . ) contains the print environment information related to one of the color conversion tables in the header part 11 thereof.

For example, the print data 10*a* shown in FIG. 40 is the data created based in the color conversion table T1, and in the header part 11 thereof, the print environment: temperature 20° C.; humidity 40%; print resolution 300dpi is indicated.

The print data 10*b* is created based on a color conversion table which corresponds to a print environment: temperature 20° C.; humidity 40%; and print resolution 300 dpi, which print environment is stored in the header part 11 thereof.

FIG. 32 shows the print data part 12 of the C. component of the print data 10*b*, FIG. 33 shows the print data part 13 of the M component of the print data 10*b*, FIG. 34 shows the print data part 14 of the Y component of the print data 10*b*, and FIG. 35 shows the print data part 15 of the K component of the print data 10*b*.

Similarly, the print data 10*c* is created based on a color conversion table which corresponds to a print environment: temperature 30° C.; humidity 60%; and print resolution 600 dpi, which print environment is stored in the header part 11 thereof.

FIG. 36 shows the print data part 12 of the C. component of the print data 10*c*, FIG. 37 shows the print data part 13 of the M component of the print data 10*c*, FIG. 38 shows the print data part 14 of the Y component of the print data 10*c*, and FIG. 39 shows the print data part 15 of the K component of the print data 10*c*.

Further, the print data 10*d* shown in FIG. 40 is the data created based in the color conversion table 90, and in the header part 11 thereof, the print environment: temperature 50° C.; humidity 100%; print resolution 1200 dpi is indicated.

If the user inputs an instruction regarding the printing operation with respect to the print data group stored in the print data storing area 1133, the application through which the instruction is input or the OS calls the print executing program for execution.

It should be noted that the print data receiving procedure illustrated in FIG. 41 is a procedure in which one print data group is processed. For the plurality of print data groups, respective print data receiving procedures (FIG. 41) are executed independently of and parallelly to each other.

As shown in FIG. 41, when the print conditions are input, they are stored in the RAM 1130 (S21). The user can select a desired factor as the print condition and set a desired value to the selected factor using the operation panel 28. The procedure may be modified such that, if the print conditions have been input, step S21 is skipped. Further, the procedure may be modified such that default values are set if the print conditions are not input in S21. For example, if the user intends to print an image in accordance with a desired print resolution and/or a desired printing method, the user can designate the print resolution and the print method as the print conditions, using the operation panel 28, and input desired values for the factors.

Then, process waits for the depression of the print start button (S22: NO). When the print start button provided to the operation panel 28 is depressed (S22: YES), the current environment conditions are detected (i.e., the temperature and humidity are measured using the temperature sensor 1181 and the humidity sensor 1182), which are stored in the RAM 1130 (S23).

In S24, based on the print condition and environment condition (i.e., print environment) stored in the RAM 1130, process determines the print data 10 corresponding to the print environment closest to the measured print environment from among the group of print data stored in the print data storing area 1133 (S24). As described above, in each piece of print data stored as the print data group is configured such that the header part thereof contains the print environment the data corresponds. Thus, process selects the appropriate print data 10 based on the information stored in the header part 11. It should be noted that, if there is no print data corresponding to the print environment which coincides with the measured environment (i.e., a combination of the print condition and environment condition) stored in the RAM 1130, the print data 10 closest to the measured print environment is selected in S24.

That is, if "print resolution: 300 dpi" is input as the print condition in S21 and "temperature: 20° C." and "humidity: 40%" are measured in S23, the process obtains the print data 10*b* from among the print data group 10 (see FIG. 30) shown in FIG. 40. As another example, if "print resolution: 600 dpi" and is input in S21 and "temperature: 30° C." and "humidity: 60%" are measured in S23, the process obtains the print data 10*c* from among the print data group 10 shown in FIG. 40.

In S25, according to the print data 10 selected in S24, the printing operation is executed. In the inkjet printer 1100, the print data 10 selected in S24 is transmitted from the print data storing area 1133 to the print buffer 1134 and the printing operation is started. When the feed motor 1153 is driven, the object is fed in a direction perpendicular to the reciprocating direction of the carriage of the inkjet printer. One surface of the object faces the inkjet head 1141 mounted on the carriage, and the ink drops are ejected to the object in accordance with the print data, with the moving direction of the carriage being a main scanning direction, a direction in which the object is fed being an auxiliary scanning direction.

Specifically, if the print data 10*b* is selected in S24, based on the print data parts 12, 13, 14 and 15, that is, based on the print data as shown in FIGS. 32 through 35, the printing operation is executed. If the print data 10*c* is selected in S24, based on the print data parts 12, 13, 14 and 15 thereof, that is, based on the print data as shown in FIGS. 36 through 39, the printing operation is executed.

After the printing operation, process returns to S22 where process waits for the depression of the print start button. If the print start button is depressed again (S22: YES), the current environment condition is measured again (S23), and optimum print data 10 is selected from among the print data group stored in the print data storing area 1133 in accordance with the print condition input in S21 and the measured environment condition (S24), and the print operation is executed in accordance with the thus selected print data 10 (S25). When the end of the printing operation is instructed or the inkjet printer 1100 is powered off, the print executing program is terminated and the procedure shown in FIG. 41 is finished.

As described above, in the PC 1200 and the inkjet printer 1100 according to the second embodiment, a plurality of pieces of print data respectively corresponding to a plurality of combinations of print conditions and environment conditions are created in accordance with an image data subjected to be printed in the PC 1200. Then, the plurality of pieces of print data (i.e., a print data group) are transmitted in the inkjet printer 1100. Then, when the printing operation is executed, the optimum print data corresponding to the print conditions and environment conditions at that time is selected, and the printing operation is executed in accordance with the selected print data. With such a configuration, the process time when the printing operation is executed is relatively short, and the appropriate printing operation corresponding to the print conditions and environment conditions at the time of printing can be executed.

Further, since the optimum print data 10 is selected based on the environment conditions such as temperature and humidity, and the print conditions such as the type of the object, print resolution and printing method, deterioration of the print quality due to unconformity between the setting and print environment can be avoided.

According to the second embodiment, the user of the inkjet printer 1100 can operate the inkjet printer 1100 to start printing. Thus, creation of the print data and execution of the printing operation can be performed independently. Accordingly, the user of the PC 1200 can arbitrarily determine the timing when the print data 10 is created, and the user of the inkjet printer 1100 can arbitrarily determine the timing when the printing operation in accordance with the print data 10, which improves the degree of freedom in operating the PC 1200 and inkjet printer 1100. Further, according to the second embodiment, it is possible that the PC 1200 and the inkjet printer 1100 can be located remotely, which enhances the flexibility of system configuration.

As described above, after the user has instructed the inkjet printer 1100 to start printing, the environment conditions are measured using the temperature sensor 1181 and the humidity sensor 1182. Therefore, the optimum print data 10 is selected based on the latest environment conditions, and beautiful print results can always be obtained.

Further, the printing operation can be executed many times based on the same image data. Even though the same image data is used, optimum print data 10 is selected for each printing operation based on the print condition and environment condition, beautiful print results can always be obtained.

Third Embodiment

Next, the PC 1200 and the inkjet printer 1100 according to the third embodiment will be described. In the third embodiment, the image data created by the applications running on the PC 1200 is transmitted as it is, i.e., as the RGB format image data, to the inkjet printer 1100. Such a configuration can be realized by the driver of the inkjet printer 1100 installed in the PC 1200. That is, the driver is configured such that the image data received from the application is transmitted as is to the inkjet printer 1100.

According to the third embodiment, when the image data is transmitted to the inkjet printer 1100, the image data received from the application is stored in the input image data storing area 1232 of the RAM 1230 (see FIG. 25). After the setting of the number of copies, the size of the printout etc. have been set, the image data is stored in the print queue 1254 of the HDD 1250 (see FIG. 26), which is transmitted to the inkjet printer 1100.

In the inkjet printer 1100, the received image data is stored in the received image buffer 1232 of the RAM 1230. Then, the print data creating program is launched and the print data creating procedure shown in FIG. 30 is executed. The procedure itself is the same as the procedure according to the second embodiment. According to the third embodiment, however, the print data group created in the print data creating procedure is stored in the print data storing area 1233 of the RAM 1230, different from the second embodiment in which the print data group is created in the PC 1200 and transmitted to the inkjet printer 1100.

Similarly, the printing procedure shown in FIG. 41 is executed by the CPU 1210. That is, based on the input print condition and measured environment condition, optimum print data 10 is selected from the print data group stored in the print data storing area 1233. Thus, the ink drops are ejected based on the print data which is stores din the print data buffer 1234 as in the second embodiment.

As described above, according to the second and third embodiments, the print data creating procedure is executed to create print data from the image data which is created by an application on the PC 1200. According to the second embodiment, the print data creating program is executed on the PC 1200, while in the third embodiment, the print data creating program is executed on the inkjet printer 1100.

Fourth Embodiment

Next, the inkjet printer 1100 according to the fourth embodiment will be described. As described above, according to the second embodiment, after the print data group transmitted form the PC 1200 in S19 has been stored, and after the user has input the print conditions (S21), process waits for a further instruction from the user to start printing (S22).

The procedure shown in FIG. 41 may be modified as shown in FIG. 42, which illustrates the print execution procedure according to the fourth embodiment. According to the fourth embodiment, the print conditions are also input (in S32) after the print start button is depressed (S31: YES). The other steps (S33-S35) are similar to those (S23-S25) in FIG. 41.

According to the fourth embodiment, after the instruction to start printing is input by the user, the print conditions are input. Therefore, the user can easily change the print conditions whenever necessary.

Fifth Embodiment

Next, the operation of the inkjet printer 1100 according to the fifth embodiment will be described. In the second, third and fourth embodiments described above, the print environment is defined by the print conditions and the environment conditions, and the print data 10 corresponding to the thus defined print environment is selected and the printing operation is carried out.

The procedure shown in FIG. 41 or FIG. 42 may be modified as shown in FIG. 43, which illustrates the print execution procedure according to the fifth embodiment. As shown in FIG. 43, according to the fifth embodiment, the print condition is not input, and only the environment conditions, which are measured with the temperature sensor and the humidity sensor, are used (S42). In S43, the print data 10 corresponding to the print environment closest to the environment conditions obtained in S42 is selected in S43. Alternatively, default values of the print conditions may be obtained, and using the default values of the print conditions and the measured environment conditions, the print data 10 for the closest print environment is selected. The other steps (S41 and S44) are similar to the steps (S21 and S25) in FIG. 41.

According to the fifth embodiment, when the print start instruction is made, the environment conditions are measured, the optimum print data 10 is selected based on the measured environment conditions, and then printing is executed. Therefore, even when the user does not intend to set the print conditions or when the user wishes to simplify the procedure, optimum print data can be selected and printing is carried out.

On the contrary to the above example, it may also be possible to modify the procedure such that the environment conditions are not measured and only the print conditions are input and referred to when the print operation is carried out. Alternatively or optionally, a part of the environment conditions and/or a part of the print conditions may be used to select the optimum print data from among the plurality of pieces of the print data respectively corresponding to different print environments.

The present invention need not be limited to the above-described exemplary embodiments, and various modifications can be made without departing from the scope of the invention. For example, in the second, third and fourth embodiments, the print environment is defined by the print conditions and environment conditions. However, the factors to be included in the print conditions need not be limited to those described in the embodiments. Factors included in the print conditions and in the environment conditions can be determined arbitrarily by the user or designer of the inkjet printing system.

Further, it is not necessary that the factors defining the combinations of the print conditions and environment conditions when the print data 10 is created in the print data creating procedure shown in FIG. 30 and the factors input as the print conditions and the environment conditions by the user during the print execution procedure shown in FIG. 41 completely coincide with each other. For example, "temperature", "print resolution" and "type of the object" are used as the factors defining the print environment in the print data crating procedure in FIG. 30, while "temperature", "humidity" and "print resolution" may be used as the factors defining the print environment in the print executing procedure in FIG. 41. In such a case, the optimum print data 10 may be selected based on the factors common in both procedures (i.e., "temperature" and "print resolution") in S24 of FIG. 31.

In the print execution procedure (FIG. 41), if there is not print data corresponding to the print conditions and environment conditions that coincide with the current print conditions and environment conditions in S24, the optimum print data 10 may be determined as follows.

Firstly, for each of the environment condition and print condition, a table (i.e., an output side color conversion table) corresponding to a condition closest to the print environment when the output side color conversion table was created (see FIG. 31) is selected. For example, it is assumed that the print condition and environment condition obtained in S21 and S23 are "temperature: 23° C.", "humidity: 38%", "print resolution: 400 dpi". Since the output side color conversion tables (see FIG. 31) are configured to have six kinds of tables in terms of temperature: 0° C., 10° C., 20° C., 30° C., 40° C. and 50° C., the print data corresponding to the temperature of 20° C., which has the smallest difference (absolute value) with respect to the measured temperature (23° C.), is selected. Similarly, with regard to the "humidity", the color conversion tables are prepared for 20%, 40%, 60%, 80% and 100%, therefore the print data corresponding to the humidity of 40%, which is has the smallest different (absolute value) with respect to the measured humidity (38%), is selected. Further, the print data corresponding to the print resolution of 300 dpi, which has the smallest difference (absolute value) with respect to the set value (400 dpi) among the print data corresponding to the print resolutions of 300 dpi, 600 dpi and 1200 dpi, is selected.

As a result, in S24, among the print data group (see FIG. 40), the print data corresponding to the print environment of ("temperature"=20° C., "humidity"=40% and "print resolution"=300 dpi) is selected. As above, even if the print data having exactly the same print and environment conditions does not exist, print data closely corresponding to the actual print environment can be selected. Although not explained in detail, steps S34 and S43 can be executed in a similar manner.

In the second through fifth embodiments, the instruction to start printing is made on the inkjet printer 1100 side. This can of course be modified such that the instruction to start printing is made on the PC 1200, as in a normal printing system. In such a case, the user may input the print conditions as well as the print instruction. Then, commands instructing the printing and print conditions are transmitted from the PC 1200 to the inkjet printer 1100. Upon receipt of the commands, the environment conditions are measured in the inkjet printer 1100. Then, based on the received print conditions and measured environment conditions, the optimum print data 10 is selected from among the print data group stored in the RAM 1230, and the printing operation start automatically.

In the modified case described above, inputting of the print conditions by the user can be omitted. For example, the PC 1200 may be configured such that default values are automatically set to the print conditions when the user instructs printing, and the that the default values are transmitted to the inkjet printer 1100 as well as the instruction of printing. Alternatively, the inkjet printer 1100 may be configured such that the default print conditions are automatically set upon receipt of the print command from the PC 1200. Further alternatively, if the print conditions need not be considered, the inkjet printer 1100 may be configured such that the optimum print data 10 is selected based only on the environment conditions as measured, upon receipt of the command instructing to start printing.

In the above embodiments, the RGB data is converted into the L*a*b* data, which is further converted into the CMYK data. The invention need not be limited to such a configuration, and the input data could have another type of data such as CMYK data or grayscale data. In such as case, using appropriate profile (input side color conversion tables), the color space of the input data can be converted in to the color space of the L*a*b* data.

In the above embodiments, the printing system is described to have the PC and inkjet printer, which are separately provided. The invention need not be limited to such a configuration, and a single device including the functions of the PC and inkjet printer can also be subject to the present invention.

Further, the invention can be applied to a printing system having another type of printing device such as a dot-impact printer, laser printer, thermal-transfer printer, line printer and the like.

In the first embodiment, the print data is created taking the effect of washing after the printing operation into account. In the second through fifth embodiments, the pint data is created to meet the print environment. It should be noted that, also in the second through fifth embodiments, the effect of washing may be taken into account when the print data is created.

In the first embodiment, the color conversion table is determined firstly, and then, appropriate print data is created based on the determined color conversion table. It is also possible that, as in the second through fifth embodiments, a plurality of pieces of print data corresponding to various combinations of the type of the fabric and washing method may be created and appropriate data is selected on the inkjet printer when the image is printed.

What is claimed is:

1. A print data creating device that creates print data for an inkjet printer, the inkjet printer printing an image on a fabric in accordance with the print data, the print data creating device comprising:

a color conversion table storage that stores color conversion tables corresponding to washing conditions representing conversions to be made when the fabric will be washed after the image is printed thereon;

a washing condition designating system which is operated by a user to input a washing condition;

a table selecting system that selects one of the color conversion tables stored in the color conversion table storage in accordance with the washing condition input through the washing condition designating system; and a print data creating system that creates the print data using the color conversion table selected by the table selecting system.

2. The print data creating device according to claim 1, wherein the washing condition designating system includes:

a fabric type input system with which the user can input a type of the fabric; and a washing method determining system that determined a washing method based on the fabric type input through the fabric type input system, the washing method being included in the washing condition.

3. The print data creating device according to claim 1, wherein the washing condition designating system includes a washing method input system through which the user inputs a washing method with which the fabric will be washed after the image is printed thereon.

4. The print data creating device according to claim 3, wherein the washing condition designating system is used to designated at least one of a kind of washing and the number of times of washings.

5. The print data creating device according to claim 1,
wherein the washing condition designating system includes:
a fabric type input system with which the user can input a type of the fabric; and
a washing method input system with which the user input a washing method to be used when the fabric is washed after the image is printed thereon.

6. The print data creating device according to claim 5,
wherein the washing condition designating system is used to designated at least one of a kind of washing and the number of times of washings.

7. A method of creating print data for an inkjet printer and printing an image on a fabric in accordance with the print data, the method comprising the steps of:
designating a washing condition to be applied to the fabric on which the image is formed;
selecting a color conversion table from among a plurality of preliminarily stored color conversion tables in accordance with the washing condition input in the designating step; and
creating the print data using the color conversion table selected in the designating step; and
printing an image on the fabric based on the print data.

8. The method according to claim 7,
wherein the designating step includes steps of:
inputting a fabric type input; and
determining a washing method based on the fabric type input in the inputting step.

9. The method according to claim 7,
wherein the designating step includes a step of inputting a washing method with which the fabric will be washed after the image is printed thereon.

10. The method according to claim 8,
wherein the step of designating designates at least one of a kind of washing and the number of times of washings.

11. The method according to claim 7,
wherein the step of designating includes the steps of:
inputting a type of the fabric; and
inputting a washing method to be used when the fabric is washed after the image is printed thereon.

12. The method according to claim 11,
wherein the step of designating designates at least one of a kind of washing and the number of times of washings.

13. The method according to claim 7, further comprising the steps of:
creating a color conversion table by measuring a test patch that has been formed on the fabric, the fabric having been washed after the test patch was printed thereon; and
storing the color conversion table created in the step of creating.

14. A computer readable medium comprising computer readable instructions that cause a computer to execute a procedure of creating print data for an inkjet printer, the inkjet printer printing an image on a fabric in accordance with the print data, the procedure comprising the steps of:
designating a washing condition to be applied to the fabric on which the image is formed;
selecting a color conversion tables from among a plurality of preliminarily stored color conversion tables in accordance with the washing condition input in the designating step; and
creating the print data using the color conversion table selected in the designating step.

* * * * *